(12) United States Patent
Ng et al.

(10) Patent No.: US 9,715,827 B2
(45) Date of Patent: Jul. 25, 2017

(54) MULTI-VIEW TRAFFIC SIGNAGE

(71) Applicant: Misapplied Sciences, Inc., Redmond, WA (US)

(72) Inventors: Albert Han Ng, Redmond, WA (US); Paul Henry Dietz, Redmond, WA (US); David Steven Thompson, Redmond, WA (US)

(73) Assignee: Misapplied Sciences, Inc., Redmond, WA (US)

(*) Notice: Subject to any disclaimer, the term of this patent is extended or adjusted under 35 U.S.C. 154(b) by 0 days.

(21) Appl. No.: 15/088,912

(22) Filed: Apr. 1, 2016

(65) Prior Publication Data

US 2016/0293003 A1    Oct. 6, 2016

Related U.S. Application Data

(60) Provisional application No. 62/141,716, filed on Apr. 1, 2015.

(51) Int. Cl.
| | |
|---|---|
| G08G 1/09 | (2006.01) |
| G06K 9/00 | (2006.01) |
| G06K 9/52 | (2006.01) |
| G06K 9/62 | (2006.01) |

(Continued)

(52) U.S. Cl.
CPC ......... *G08G 1/091* (2013.01); *G06K 9/00785* (2013.01); *G06K 9/52* (2013.01); *G06K 9/6267* (2013.01); *G08G 1/0141* (2013.01); *G08G 1/14* (2013.01); *G06K 2209/15* (2013.01); *G06K 2209/23* (2013.01)

(58) Field of Classification Search
CPC .. G08G 1/091; G08G 1/0141; G06K 9/00335; G06K 9/00785; G06K 9/52; G06K 9/6267

USPC .......................................... 701/117
See application file for complete search history.

(56) References Cited

U.S. PATENT DOCUMENTS

| | | | |
|---|---|---|---|
| 7,990,498 B2 * | 8/2011 | Hong ................... | G02B 27/22 |
| | | | 349/106 |
| 8,461,995 B1 | 6/2013 | Thornton | |
| 9,080,279 B2 * | 7/2015 | Jun ..................... | H02K 21/12 |

(Continued)

FOREIGN PATENT DOCUMENTS

| | | |
|---|---|---|
| EP | 2685735 A1 | 1/2014 |
| WO | 0224470 A | 3/2002 |
| WO | 2013183108 A1 | 12/2013 |

OTHER PUBLICATIONS

Authorized Officer: Jacinta Molloy, "International Search Report and Written Opinion" dated Sep. 29, 2016 in PCT Application No. PCT/US2016/037185.

(Continued)

*Primary Examiner* — McDieunel Marc
*Assistant Examiner* — James E Stroud
(74) *Attorney, Agent, or Firm* — Kaplan Breyer Schwarz, LLP

(57) ABSTRACT

The specification and drawings present a multi-view traffic signage system using electronic multi-view displays (EM-VDs) and a corresponding method to controllably direct individual information to vehicles (or to "moving vehicles" as broadly defined herein) as appropriate to their individual circumstances. The system may comprise one or more multi-view displays, one or more computers, and one or more vehicular sensing systems.

26 Claims, 15 Drawing Sheets

(51) Int. Cl.
*G08G 1/01* (2006.01)
*G08G 1/14* (2006.01)

(56) References Cited

U.S. PATENT DOCUMENTS

| | | |
|---|---|---|
| 2003/0115096 A1 | 6/2003 | Reynolds et al. |
| 2003/0156260 A1 | 8/2003 | Putilin et al. |
| 2005/0195330 A1 | 9/2005 | Zacks et al. |
| 2009/0273486 A1* | 11/2009 | Sitbon ............... G08G 1/095 340/907 |
| 2010/0085517 A1* | 4/2010 | Hong ............... G02B 27/22 349/106 |
| 2010/0207961 A1* | 8/2010 | Zomet ............ G02B 27/2214 345/630 |
| 2010/0214537 A1 | 8/2010 | Thomas |
| 2011/0159929 A1 | 6/2011 | Karaoguz et al. |
| 2011/0216171 A1 | 9/2011 | Barre et al. |
| 2011/0242298 A1* | 10/2011 | Bathiche ............ G02B 5/045 348/54 |
| 2011/0304613 A1 | 12/2011 | Thoresson |
| 2012/0026157 A1* | 2/2012 | Unkel ............... G09G 3/003 345/419 |
| 2012/0218253 A1* | 8/2012 | Clavin ............ G02B 27/0093 345/419 |
| 2013/0093752 A1* | 4/2013 | Yuan ............... H04N 13/047 345/419 |
| 2013/0114019 A1* | 5/2013 | Ijzerman ............ G09F 19/14 349/61 |
| 2014/0015829 A1* | 1/2014 | Park ............... H04N 13/0454 345/419 |
| 2014/0111101 A1 | 4/2014 | McRae |
| 2015/0020135 A1 | 1/2015 | Frusina et al. |
| 2015/0042771 A1 | 2/2015 | Jensen et al. |
| 2015/0049176 A1 | 2/2015 | Hinnen et al. |
| 2015/0062314 A1* | 3/2015 | Itoh ............... G06F 3/012 348/55 |
| 2015/0198940 A1 | 7/2015 | Hwang et al. |
| 2016/0012726 A1* | 1/2016 | Wang ............... G08G 1/0112 340/932.2 |
| 2016/0210100 A1 | 7/2016 | Ng et al. |
| 2016/0212417 A1 | 7/2016 | Ng et al. |
| 2016/0224122 A1 | 8/2016 | Dietz et al. |
| 2016/0227201 A1* | 8/2016 | Ng ............... H04N 13/0447 |
| 2016/0261837 A1 | 9/2016 | Thompson et al. |
| 2016/0261856 A1 | 9/2016 | Ng et al. |
| 2016/0341375 A1 | 11/2016 | Baker |
| 2016/0341377 A1 | 11/2016 | Eddins |
| 2016/0366749 A1 | 12/2016 | Dietz et al. |
| 2016/0371866 A1 | 12/2016 | Ng et al. |

OTHER PUBLICATIONS

"Office Action" dated Oct. 6, 2016 in U.S. Appl. No. 15/060,527.
Officer: Patricia Stein, "International Search Report and Written Opinion", dated Jun. 3, 2016, issued in related PCT Application: PCT/US2016/04122.
Officer: Patricia Stein, "International Search Report and Written Opinion", dated May 12, 2016, issued in related PCT Application: PCT/US2016/020784.
"Non-Final Office Action" Dated Jan. 31, 2017, Issued in U.S. Appl. No. 15/180,341.
"Non-Final Office Action", U.S. Appl. No. 15/002,158, Dated Mar. 3, 2017, p. 19.
Authorized Officer: Mehrdad Dastouri, "International Preliminary Report on Patentability" Dated Feb. 3, 2017 issued in PCT International Application PCT/US16/14122, 21 pp.
"Non-Final Office Action", Dated Mar. 22, 2017, Issued in related U.S. Appl. No. 15/002,164, 28 pp.
Officer: Jeffrey Harold, "International Preliminary Report on Patentability", Completed Mar. 20, 2017, Issued in International Patent Application PCT/US2016/020784, 6 pp.
"Non-Final Office Action", Dated Mar. 24, 2017, Issued in related U.S. Appl. No. 15/002,175, 26 pp.

* cited by examiner

MULTI-VIEW TRAFFIC SIGNAGE

CROSS REFERENCE TO RELATED APPLICATIONS

This case claims priority and the benefit of the filing date under 35 USC 119(e) of U.S. provisional patent application Ser. 62/141,716 filed Apr. 1, 2015, which is incorporated by reference herein.

FIELD OF THE INVENTION

The present invention relates to static and electronic displays, and, more particularly, to using electronic multi-view displays for traffic-related applications.

BACKGROUND OF THE INVENTION

Traffic signage is widely used to provide instructional, warning, and supplementary messages in multiple directions to vehicles on or near roads, intersections and highways. While such signage is sufficient to broadcast information to all vehicles, there are many situations where it may be desirable to direct different information to different vehicles. Multiple traffic signs in one location often present irrelevant or sometimes even conflicting information for a particular vehicle driver, causing confusion, delays, and accidents. Therefore, a traffic signage system that directs different images to different moving vehicles may be desired.

SUMMARY OF THE INVENTION

Various embodiments of the invention include a multi-view traffic signage system using electronic multi-view displays (EMVDs) and a corresponding method to controllably direct individual information to vehicles (or to "moving vehicles" as broadly defined herein) as appropriate to their individual circumstances. The system may comprise one or more multi-view displays, one or more computers, and one or more vehicular sensing systems.

The present invention is widely applicable to many multi-view traffic signage applications. Various embodiments include applications of multi-view traffic signage systems for moving vehicles including, but not limited to: traffic light signage applications, speed signage applications, classification (such as characterization and/or identification) signage applications, toll signage applications, lane-specific signage applications, navigational/directional signage applications, merging signage applications, cruising warning signage applications, information signage applications, clearance signage applications, and parking signage applications.

According to a first aspect of the invention, a method for providing traffic instructions to drivers in moving vehicles comprises providing, by one or more sensing devices, detection data for a plurality of moving vehicles in one or more viewing regions of corresponding one or more electronic multi-view displays (EMVDs); determining, by one or more computers based on the detection data, one or more parameters at least including a location parameter for each of the plurality of moving vehicles; —generating, by the one or more computers, a plurality of traffic-related contents using the one or more determined parameters for each of the plurality of moving vehicles; and displaying, on the one or more EMVDs, the generated traffic-related contents for presenting individually to each of the plurality of moving vehicles.

According further to the first aspect of the invention, the one or more parameters can further comprise any combination of classification, height, speed, acceleration, movement pattern, direction (and the like) parameters of the plurality of moving vehicles, so that generating different traffic-related contents are further based, at least in part, upon the determined further parameters of the plurality of moving vehicles.

According further to the first aspect of the invention, the plurality of moving vehicles can approach an intersection comprising a multi-view (MV) traffic light, and the determining of one or more parameters can further comprise determining a speed parameter for each of the plurality of moving vehicles, where color lights of the MV traffic light comprise EMVDs. Further, each of the color lights of the MV traffic light may be a single-color EMVD and configured to provide a standard default color of red, yellow or green. Still further, the MV traffic light may be assigned, per instructions from an external controller, a yellow default color to be displayed on a yellow EMVD, so that, based on the determined location and speed parameters for at least two vehicles moving toward the MV traffic light in front of the yellow EMVD, said generating of traffic-related contents may comprise: assigning a green color for displaying on a green EMVD to be presented to a first vehicle of the at least two vehicles, the first vehicle being closer to the MV traffic light than a second vehicle of the at least two vehicles. Yet still further, the generating of traffic-related contents may further comprise: assigning a red color for displaying on a red EMVD to be presented to the second vehicle of the at least two vehicles.

Still further according to the first aspect of the invention, the generated traffic-related contents can be displayed on one of the one or more EMVDs supplementary to a traffic light at an intersection. Further, the generated traffic-related contents may indicate whether or not a vehicle should proceed through the intersection. Still further, at least one of the supplementary EMVDs and the traffic light may be in a vicinity of each other, so that both may be visible from the plurality of moving vehicles approaching the intersection.

According further to the first aspect of the invention, the determining of one or more parameters can further comprise determining a speed parameter for selected vehicles of the plurality of moving vehicles, and said generating of traffic-related contents can comprise: assigning individual traffic messages for the selected vehicles to be simultaneously displayed on at least one EMVD of the one or more EMVDs. Further, one of the individual traffic messages may direct at least one driver to reduce speed. Still further, at least one EMVD may be a segmented character EMVD for displaying simultaneously current speeds to the selected vehicles. Yet still further, the selected vehicles may be moving in different lanes in view of the at least one EMVD.

According still further to the first aspect of the invention, one content of the traffic related contents presented to one vehicle of the plurality of moving vehicles can be generated using at least in part the detection data provided by a first sensor and a second sensor of the one or more sensing devices, such that at least one of the one or more parameters can indicate that the first and second sensors are sensing the same one vehicle, so that the one content can be continuously presented to the one vehicle when the one vehicle is no longer in a range of the first sensor.

According yet further still to the first aspect of the invention, the determining of one or more parameters can further comprise determining a classification parameter for selected vehicles of the plurality of moving vehicles, and the generating of traffic-related contents can comprise: assigning individual traffic messages for the selected vehicles to be simultaneously displayed on at least one EMVD of the one or more EMVDs. Further, one of the individual traffic messages may direct trucks to exit and one another of the individual traffic messages may direct autos to merge.

Yet still further according to the first aspect of the invention, as several vehicles of the plurality of moving vehicles may approach a tollgate, and the determining of one or more parameters further may comprise determining a classification parameter including a unique identifier (such as a license plate) for each of several vehicles, the method may further comprise: providing, by one of the one or more computers to an electronic toll collection system, the unique identifier for the each of several vehicles, and receiving, by the one computer from the electronic toll collection system, account toll information for the each of several vehicles, so that the generated traffic-related contents comprise account toll information for the each of several vehicles, followed by displaying the account toll information on at least one EMVD of the one or more EMVDs individually to the each of several vehicles.

Still yet further according to the first aspect of the invention, at least one lane of a multi-lane road may be obstructed, and several vehicles of the plurality of moving vehicles may move in multiple lanes including the at least one lane in view of one EMVD of the one or more EMVDs, so that said generating of traffic-related contents may comprise generating different individual messages for displaying on the one EMVD to one or more of the several vehicles to help facilitate merging due to the obstruction in the at least one lane.

Still further still according to the first aspect of the invention, the method can further comprise: receiving, by one of the one or more computers from at least one vehicle of the plurality of moving vehicles, navigational information being generated by a navigational device in the at least one vehicle, so that the generating of traffic-related contents for the at least one vehicle can be based on said navigational information and on the determined location of the at least one vehicle, where the traffic-related contents can provide further navigational details being displayed on one or several EMVDs of the one or more EMVDs to assist the at least one vehicle to reach a desired destination. Further, the navigational device can comprise a smartphone.

According further still to the first aspect of the invention, the determining of one or more parameters may further comprise determining a number of times one vehicle of a plurality of moving vehicles repeated a same route, so that said generating of traffic-related contents can comprise a warning about the number of times circling the same route and an instruction to change a destination.

According yet further still to the first aspect of the invention, the determining of one or more parameters can further comprise determining a height parameter for all vehicles of the plurality of moving vehicles in order to be within a clearance height of infrastructure toward which said all vehicles are moving, and said generating of traffic-related contents may comprise: assigning individual traffic warning messages about vehicle's height for said all vehicles, to be displayed on at least one EMVD of the one or more EMVDs. Further, one of the individual traffic messages to a vehicle may direct a vehicle to exit because said vehicle is too tall, or may confirm that a vehicle's height is below a threshold.

According to a second aspect of the invention, a multi-view traffic signage system, comprising: one or more sensing devices, configured to provide detection data of a plurality of moving vehicles in one or more viewing regions of corresponding one or more electronic multi-view displays (EMVDs); one or more computers, configured: to determine, based on the detection data, one or more parameters at least including a location parameter for each of the plurality for moving vehicles, and to generate a plurality of traffic-related contents using the one or more determined parameters for each of the plurality of moving vehicles; and one or more EMVDs, configured to display the generated traffic-related contents for presenting individually to each of the plurality of moving vehicles.

According to a third aspect of the invention, a method, for providing traffic instructions to divers in moving vehicles, comprising: receiving, by at least one computer from one or more sensing devices, detection data for a plurality of moving vehicles in one or more viewing regions of corresponding one or more electronic multi-view displays (EMVDs); determining, by the at least one computer based on the detection data, one or more parameters at least including a location parameter for each of the plurality of moving vehicles; generating, by the at least one computer, a plurality of traffic-related contents using the one or more determined parameters for each of the plurality of moving vehicles; and providing instructions to the one or more EMVDs for displaying the generated traffic-related contents for presenting individually to each of the plurality of moving vehicles.

It is noted that this summary provides a selection of simplified concepts that are further described in the detailed description and accompanying drawings. It does not exhaustively list the features of the invention, nor is it intended to restrict the scope of the claimed subject matter.

BRIEF DESCRIPTION OF THE DRAWINGS

These and other features and aspects of the present disclosure will become better understood when the following detailed description is read, with reference to the accompanying drawings, in which like characters represent like parts throughout the drawings, wherein.

DETAILED DESCRIPTION

Figure 1A:
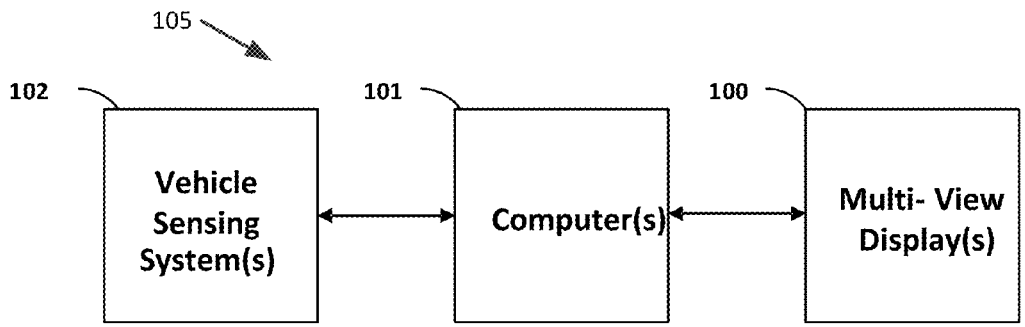
FIG. 1A is a generalized block diagram of a multi-view traffic signage system, according to an embodiment of the invention.

The terms appearing below and inflected forms thereof are defined for use in this disclosure and the appended claims as follows:

"Classification parameter" means a type of a vehicle identified and/or characterized based on a number of parameters, including but not limited to: a license plate number, a type of a vehicle (passenger car, truck, bus, etc.), electronic toll tag, loaded vs. unloaded vehicle, weight class, hazardous materials, emergency vehicle, handicap vehicle, and the like.

"Content" means whatever is delivered to a viewer via the MVD.

"Electronic multi-view display" or "EMVD" means a type of the MVD (described herein) that is capable of simultaneously presenting different respective images to different viewers/drivers that are at different viewing angles and/or distances with respect to the EMVD. The images presented on the electronic display may be dynamically changed to display different contents.

"Height parameter" means a height of a vehicle estimated using one or more sensors (vehicular sensing systems).

"Location": means an instantaneous location of a vehicle (for real-time implementation) detected by a vehicular sensing system (using one or more sensing devices) from which a driver in the vehicle may observe an EMVD. For the purposes of this document, a term "location" may be equivalent to a term "location parameter".

"Moving vehicle" means a vehicle in a process of moving, which is broadly interpreted for the purposes of this invention as a constant speed movement, a variable speed movement, stop and go movement, etc.

"Multi-view display" or "MVD" means a display that is capable of simultaneously presenting different respective images to different viewers/drivers that are at different viewing angles (locations) and/or distances with respect to the MVD. The different respective images seen by different viewers/drivers are displayed in the same location on the display, i.e., being overlapping. In general, the MVD can be a static multi-view signage print (SMVSP) such as a lenticular print or an electronic multi-view display (EMVD). For the purposes of this document, the MVD should be interpreted as the EMVD.

"Multi-view traffic light" or "MV traffic light" means a traffic light with color lights comprising EMVDs, where each EMVD is configured to be multi-color or single-color EMVD.

"Speed parameter" means a speed of a vehicle.

"Traffic instructions" means traffic related contents, generated based on detected data for a plurality of moving vehicles, for displaying the generated contents on at least one EMVD to present the contents individually to each of the plurality of moving vehicles.

"Traffic light" means a conventional traffic light or a multi-view (MV) traffic light.

"Viewing region" or "Viewing area" means a sum of all viewing zones/positions in 2D or 3D from which the MVD (or EMVD) is designed to be observed, so the viewers/drivers can experience multi-view functionality. Some of the viewing zones may be partially occluded (temporarily or permanently).

A traffic signage system that directs different images/messages to occupants/drivers of different moving vehicles is desirable. Such a system may reduce irrelevant or conflicting information for vehicle drivers, improving traffic flow and potentially preventing accidents.

It is believed that, following recent developments of electronic multi-view displays (EMVDs), these devices will be able to operate by simultaneously presenting different image content to each of a plurality of viewers that are at different viewing locations with respect to the EMVD. This may create further opportunities for using EMVDs for traffic-related applications, e.g., for directing/presenting different image contents to different moving vehicles, as described herein according to various embodiments of the invention.

By way of introduction, different opportunities for implementing electronic multi-view displays and other system components are examined below. It is noted that for the purposes of this document, the "MVD" should be interpreted as the EMVD. Therefore, the term "MVD" can be used below interchangeably with the term "EMVD".

A traditional display, such as LCD, LED, plasma, or projection displays, generally shows an image that is visible from all viewing locations simultaneously. Multi-view displays (MVDs/EMVDs), on the other hand, show different respective images to different viewing locations simultaneously.

In one exemplary embodiment, an EMVD may consist of one or more projection elements that may radiate light of different colors (wavelengths) and brightnesses at different angles. Each element, from a viewer's perspective, may appear to be a light source or pixel of the color and brightness projected onto that viewer. Thus, the appearance of each projection element from the perspective of any specific viewer may be dependent upon the angle from which the element is viewed. The projection element, as viewed from a particular angle, will appear to be a light source of the color and brightness of the light projected in that direction.

In another exemplary embodiment, each projection element may form a single pixel of a display, and a full graphic MVD may be formed from an array of projection elements. Standard or custom projector modules may be used to form each projection element. A processor may control each projector pixel or each group of projector pixels. All of the processors in the display may be connected via a network, and a computing device, such as a computer or a laptop, may be used to drive the display.

In an alternative exemplary embodiment, each projection element may be formed by a lens placed in front of an imager, such as an LCD (liquid crystal display), LED (light emitting diode), plasma display, or projector projecting onto a diffuser. A full EMVD may be formed from an array of lens elements placed in front of one or more imagers. In this embodiment, each lens in the array may form a projection element from the set of imager pixels beneath the lens. From different viewing angles, different pixels on the imager may be magnified by each lens, allowing the display to control the appearance of each element from different viewing angles. The number of imager pixels corresponding to each lens may determine the number of unique directions in which the display may project a differentiated image. With this technique, by varying the size and number of lenses in the array, a trade-off may be made between the pixel resolution of the multi-view image and the number of unique images and/or content simultaneously displayed. Lens arrays may include, but are not limited to, arrays of discrete lenses, dot or fly-eye lenticulars, and/or cylindrical lenticulars. Some imager technologies, such as LCD, comprise an array of pixels, each of which may comprise a plurality of spatially separated sub-pixels, for example red, green, and blue. When magnified, the sub-pixels may appear distinct, rather than blended as a single color as intended. In such cases, a diffuser may be placed in front of the imager to blend the sub-pixels before being magnified by the lens.

In still another exemplary embodiment, an EMVD may be formed from projection elements with masks. The projection element may comprise a larger lens and/or imager to create a large light of which the appearance is controllable for different viewing angles. By placing one or more masks with cutouts in front of the projection element, the display may appear as a graphic, for example an arrow, a fixed message, or a number. The masks may comprise of opaque material, with the cutout determining the shape of the graphic. Alternatively, masks may comprise filters with particular transmission spectra. By selecting filters with the appropriate transmission spectra, the appearance of the display may be selected between multiple graphics. Filters may distinguish between different wavelengths, polarizations, and/or other characteristics of light.

In yet another exemplary embodiment, an EMVD/MVD may comprise a lens, an imager, and a spatial light modulator mask. The imager may control the color and brightness of light shown in different directions, while the spatial light modulator mask may dynamically form graphics. This can allow different graphics to be shown, as opposed to fixed graphics in the case of fixed masks. In addition, the graphic shown on the spatial light modulator may be synchronized with the imager so as to temporally multiplex graphics between sets of viewers. For example, such a MVD may select between two images for each viewer. In a first time interval, the spatial light modulator may show a first graphic, while the imager and lens direct light towards a first set of viewers. In a second time interval, the spatial light modulator may show a second graphic, while the imager and lens direct light towards a second set of viewers. The multiplex rate may be fast enough so as to appear flicker-free to the human eye.

In a further exemplary embodiment of masked projection elements, an EMVD may be formed from multiple projection elements masked to appear as segments of a segmented display. Common segmented character display (such as EMVD) configurations may include, but are not limited to, 7-segment displays, 14-segment displays, and 16-segment displays. By using segmented masks, the number of projection elements required to form particular sets of characters may be reduced.

It is noted, that EMVDs may allow different images to be presented simultaneously to different locations. The angular resolution of the display may be high, allowing the display to direct different images with high specificity. For example, if each projection element of the display comprises a 1920× 1080 projector, the appearance of each element may be controlled for over 2 million locations. To align the display to the viewing space, a calibration procedure may be performed to determine the viewing angle for each projection element at each location. The procedure may produce a mapping between the viewing space and each element's projection space, allowing the calculation of which pixels in each projection element correspond to each viewing location. As a proxy for the physical viewing space, the display may be calibrated to the coordinate system of a vehicular sensing system, such as a camera. Doing so may allow a controller to specify viewing locations through a digital interface, rather than physically designating locations in the space. For example, an interface may allow a user to draw the boundaries of viewing locations in a camera feed of the space.

Furthermore, in order to improve alignment, sensing, and/or calibration, it may be desired to have depth data in addition to 2D information. For example, an issue that may arise in calibrating a multi-view display using a 2D camera is that the display may only be aligned for a given 2D plane. For some applications and/or configurations of the EMVD, the viewing space may be approximated as a 2D plane, such as, for example, a flat road with a display overhead. However, for other applications and/or configurations, a 2D plane approximation of the viewing space may not be sufficient, e.g., when a view line of a vehicle's driver towards the EMVD may be obstructed by a presence of other vehicle(s), especially when the obstructing vehicle has a greater height than the driver's vehicle. In such cases, the system may comprise one or more sensors that provide depth data. Suitable depth vehicular sensing systems may include, but are not limited to, stereoscopic cameras, time-of-flight cameras, and/or structured light projection systems. Calibration may be performed to the 3D coordinate system of the depth sensor, allowing the computation of the corresponding viewing angles for each projection element from each location in a 3D viewing space.

It is noted that this description is not an exhaustive list of possible implementations of electronic multi-view displays, and there exist many alternative embodiments that do not depart from the spirit or scope of the invention.

While many applications only require multi-view displays to direct information to different locations, many other applications require information directed to different entities/objects that may change position, such as vehicles. To achieve this, a system such as that depicted in FIG. 1A may be used.

FIG. 1A is a generalized block diagram of a multi-view traffic signage system 105, according to an embodiment of the invention. One or more EMVDs 100 controlled by one or more computers 101 may be calibrated for the viewing space(s)/region(s) of the corresponding one or more EMVDs. A vehicular sensing system(s) 102 (e.g., comprising one or more sensing devices) may capture images and/or signals of the viewing space(s)/regions(s) comprising moving vehicles, and the captured images and/or signals may be processed by the one or more computers 101 to estimate locations of the moving vehicles of interest.

For example, a suitable vehicular sensing system may comprise an array of cameras continuously monitoring the viewing space(s)/regions(s). Image processing techniques familiar to those with ordinary skill in the art may be used to detect and estimate the locations of vehicles in 2D or 3D space. Such techniques may include, but are not limited to, thresholding, segmentation, blob detection, motion estimation, clustering, and/or other methods. Additional parameters, such as object's speed and/or classification (characterization and identification), height, acceleration, movement pattern, direction and the like, can be also determined according to some embodiments described herein. The vehicular sensing system may be the same one used for calibration, or may be a separate vehicular sensing system.

Some applications utilizing multi-view displays for moving vehicles may require detection and identification of the vehicles. A single vehicular sensing system may simultaneously detect, locate, and identify the vehicles. For example, a camera system observing vehicles on the road may locate each vehicle and read each vehicle's license plate to recognize the vehicle. Alternatively, a combination of vehicular sensing systems may be used to detect, locate, and identify the vehicles. For example, a camera system may detect and locate each vehicle, while a separate license plate reader may be used to read each vehicle's license plate.

One set of sensors may be used to detect locations of vehicles, while another set of sensors may be used to characterize the vehicles to determine corresponding contents for presenting to each of the vehicles. Alternatively, a single set of sensors may accomplish both functions simultaneously.

Multiple vehicular sensing systems may be used for a single multi-view display. Conversely, one vehicular sensing system or a set of vehicular sensing systems may be simultaneously used for multiple multi-view displays. Multi-view displays in view from the same viewing area may share the same vehicular sensing system. Each of the multi-view displays may be separately, or simultaneously, calibrated to the vehicular sensing system. For example, multiple traffic signs at an intersection may share a single camera system observing that intersection.

Multi-view traffic signage systems may be permanently installed at the specified locations. For example, they may be mounted to poles, underpasses, buildings, and/or existing infrastructure. Permanently installed signage may only require calibration upon installation or other significant event. Alternatively, the systems may comprise portable units, allowing the systems to be temporarily used at certain locations and moved between locations. Calibration may be required at each new temporary location.

Figure 1B:
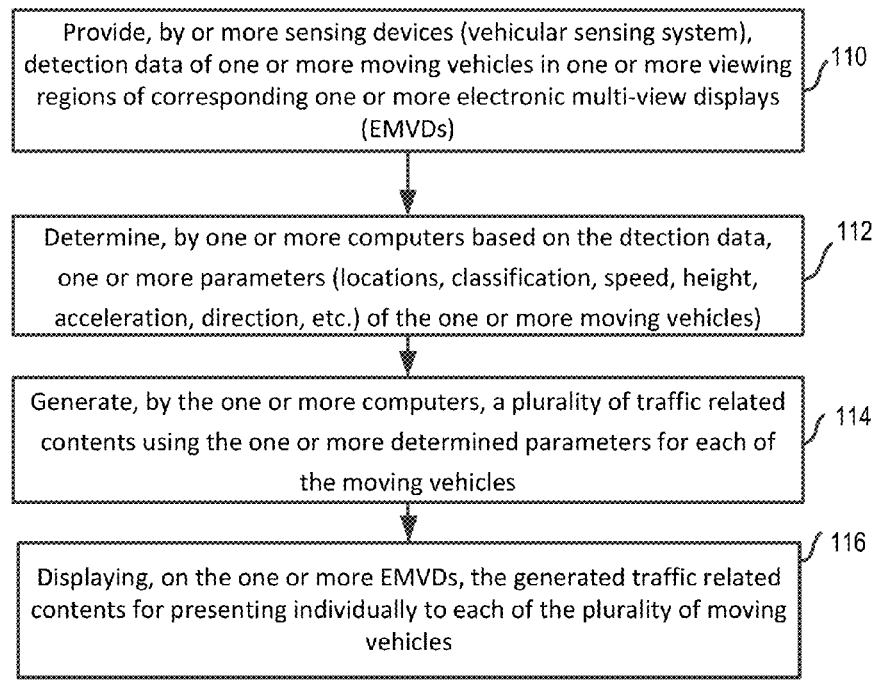
FIG. 1B is a general flow chart demonstrating how a system like shown in FIG. 1A can operate, according to an embodiment of the invention.

FIG. 1B depicts a general flowchart describing how a system like shown in FIG. 1A can operate, according to an embodiment of the invention. It is noted that the exact sequence or order of steps shown in FIG. 1B is not required, so in principle, the various steps may be performed out of the illustrated order. Also certain steps may be skipped, different steps may be added or substituted, or selected steps or groups of steps may be performed in a separate application following the embodiments described herein.

Then, in a method according to this exemplary embodiment, shown in FIG. 1B, in a first step 110, one or more sensing devices (systems) can provide detection data for a plurality of moving vehicles in one or more viewing regions of the corresponding one or more electronic multi-view displays (EMVDs). In a next step 112, one or more computers can determine, based on the detection data, one or more parameters (e.g., location, classification such as characterization and/or identification, speed, height, acceleration, movement pattern, direction, etc.) of the one or more moving vehicles.

In a next step 114, the one or more computers can generate a plurality of traffic-related contents using the one or more determined parameters for each of the moving vehicles. In a final step 116, one or more EMVDs display the generated traffic-related contents for presenting individually to each of the plurality of moving vehicles.

It is noted that this description is not an exhaustive list of possible implementations of multi-view displays, sensors, and systems, and there exist many alternative embodiments that do not depart from the spirit or scope of the invention.

Next, embodiments related to multi-view traffic light applications are discussed. Conventional traffic lights are often placed at intersections to direct traffic flow through the intersection. By signaling vehicles appropriately, traffic lights may prevent accidents by alternately directing vehicles in different directions to pass through the intersection. Typically, a conventional light comprises multiple signal colors where each color signals a different message. For example, a common configuration is red, yellow, and green, where red indicates stop and green indicates go. A short yellow signal indicates a transition state between the green and red signals. If a vehicle can safely pass through the intersection before the signal turns red, it should pass through. If a vehicle will not make it, the vehicle should stop. Unfortunately, it is often difficult for drivers to judge whether or not they will make it through a yellow signal. The timing of the yellow signal is not constant across all traffic lights. Drivers often misjudge their speeds and distances, e.g., some drivers can accelerate unnecessarily to make it through the intersection, while others slow down abruptly to avoid running a red light. The conflicting decisions that drivers need to make during a yellow light often cause accidents at intersections.

On the other hand, multi-view traffic lights (MV traffic lights), according to some embodiments described herein, may simultaneously direct different signals to each vehicle to avoid the above scenario. A multi-view (MV) traffic light is a traffic light with color lights comprising EMVDs, where each EMVD may be configured to be multi-color or single-color EMVD.

A multi-view traffic light may comprise multi-view (MV) signal lights (can be also called MV color lights). At least one MV signal light may comprise a multi-color EMVD including an imager and a lens. When viewed from different viewing angles, the lens may magnify different areas of the imager, allowing the MV signal light to appear different in color from different vehicle locations.

In one embodiment, a multi-colored signal/color light (or a multi-color EMVD) may utilize a multi-colored imager. In such an embodiment, the color of the MV color light when viewed from a location may be the color of the area of the imager magnified by the lens from that location. For example, with an imager that comprises an LCD and a diffuser, the appearance of the signal light from a viewing location may be the color and brightness of the pixels of the LCD that correspond to that location.

Multi-colored signal/color lights (implemented using the multi-color EMVD) may be less desirable than multiple single-color signal/color lights for drivers who are color-blind. A single-color signal light (e.g., red, yellow or green) may also utilize a multi-colored imager that is controlled to only show one color. Alternatively, single-color imagers (single-color EMVDs) may be used for implementing the single-color MV color/signal lights. Advantages of the single-color MV color/signal lights may include lower cost, lower complexity, and/or higher visual angular resolution. For example, a typical LCD can comprise a layer of liquid crystal sub-pixels along with a RGB (red-green-blue) color mask that can give each sub-pixel the appropriate color. Each set of RGB sub-pixels may be logically grouped as a single pixel, with each sub-pixel presenting the appropriate R, G, or B sub-component so that, when blended, the pixel appears as the appropriate color. For a single-color imager, a single-color mask of the appropriate color, for example a red mask for a red signal light, may replace the RGB color mask. This allows the sub-pixels to be decoupled, effectively increasing the visual angular resolution of the multi-view signal light.

Moreover, LCDs typically comprise a white backlight that is filtered by the liquid crystals and RGB color mask to produce a colored image. Another embodiment of a single-color signal light imager may utilize an LCD without the RGB color mask, and with the white backlight replaced with a backlight of the appropriate color. For example, a green signal light may use a green backlight, while a red signal may use a red backlight. Similarly, a projector illuminating a diffuser may typically comprise a white light source in the projector. To produce a single-color signal light, the projector may have the white light source replaced with a light source of the appropriate color.

Figure 2:
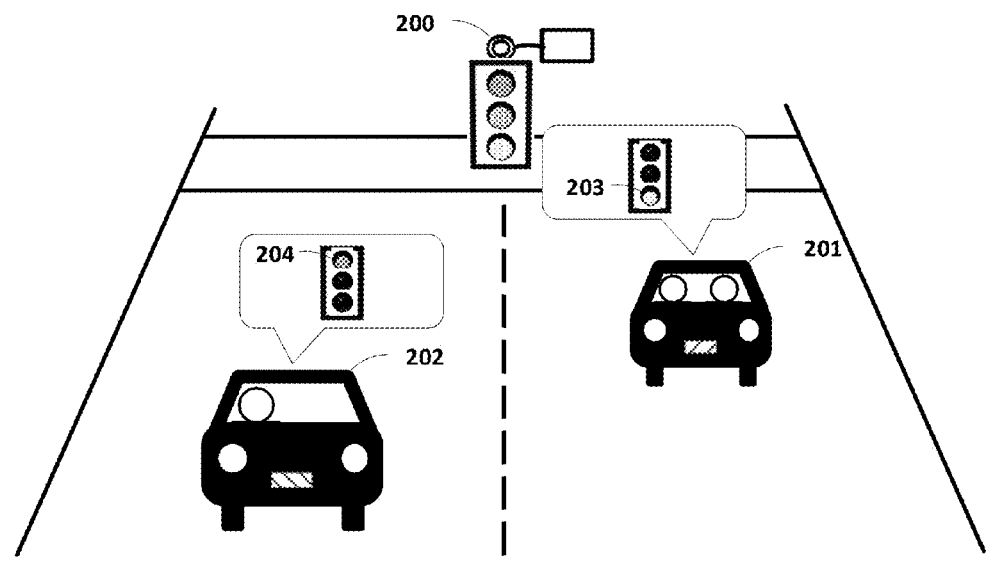
FIG. 2 is an exemplary diagram of a multi-view traffic light system in operation, according to an embodiment of the invention.

FIG. 2 depicts an exemplary multi-view traffic light system 200 in operation, simultaneously directing different signals to different vehicles 201, 202 during, for example, a yellow light transition (or yellow default color). Vehicle 201 should be able to pass through the intersection (before the yellow color becomes red), so the yellow light of the MV traffic light may be presented as a green signal 203 to the vehicle 201, e.g., using a green EMVD light of the traffic light presented to the vehicle 201 (as shown in FIG. 2), or using a multi-color yellow EMVD light for presenting green light to the vehicle 201 as explained above. The vehicle 202, on the other hand, should stop at the intersection (because it cannot reach an intersection before the yellow light becomes red), so the yellow light may be presented as a red signal 204 to the vehicle 203, e.g., using a red EMVD light of the traffic light presented to the vehicle 202 (as shown in FIG. 2), or using a multi-color yellow EMVD light presenting red light to the vehicle 202 as explained above. In an alternative embodiment, the vehicle 202 may see a standard (default) yellow light followed by a standard red light to avoid the vehicle 202 seeing other vehicles (like the vehicle 201) go through what is perceived to be a red light.

By directing only the appropriate signal to each vehicle, each driver may not need to make an instantaneous decision to go through or stop at an intersection during a yellow traffic state transition, as a driver would need to do for a yellow signal of a conventional/standard traffic light.

A MV traffic light system may comprise one or more MV traffic lights, one or more computers, and one or more vehicular sensing systems. Exemplary suitable vehicular sensing systems may include, but are not limited to, cameras, radar detectors, LIDAR detectors, ultrasonic imagers, laser scanners, induction-loop detectors, and/or the like.

In one embodiment, one or more cameras may observe the intersection and/or roads that extend from the intersection. Each traffic light may be calibrated to the views of each camera. The camera(s) may capture images and/or signals of vehicles and send them to a computer. The computer may process the images and/or signals to estimate the locations and movement characteristics of each vehicle. The computer may receive control (default) signals from an external system to control the traffic state. Based on the location, movement characteristics, and traffic state, the computer may assign a signal color presented to each vehicle. Each vehicle's assigned signal color may be simultaneously displayed to each vehicle's location by the multi-view traffic lights. A default signal color (default traffic state), received from the external system, may be assigned to all locations without detected vehicles, so that the default signal color may be displayed to all such locations.

Figure 3:
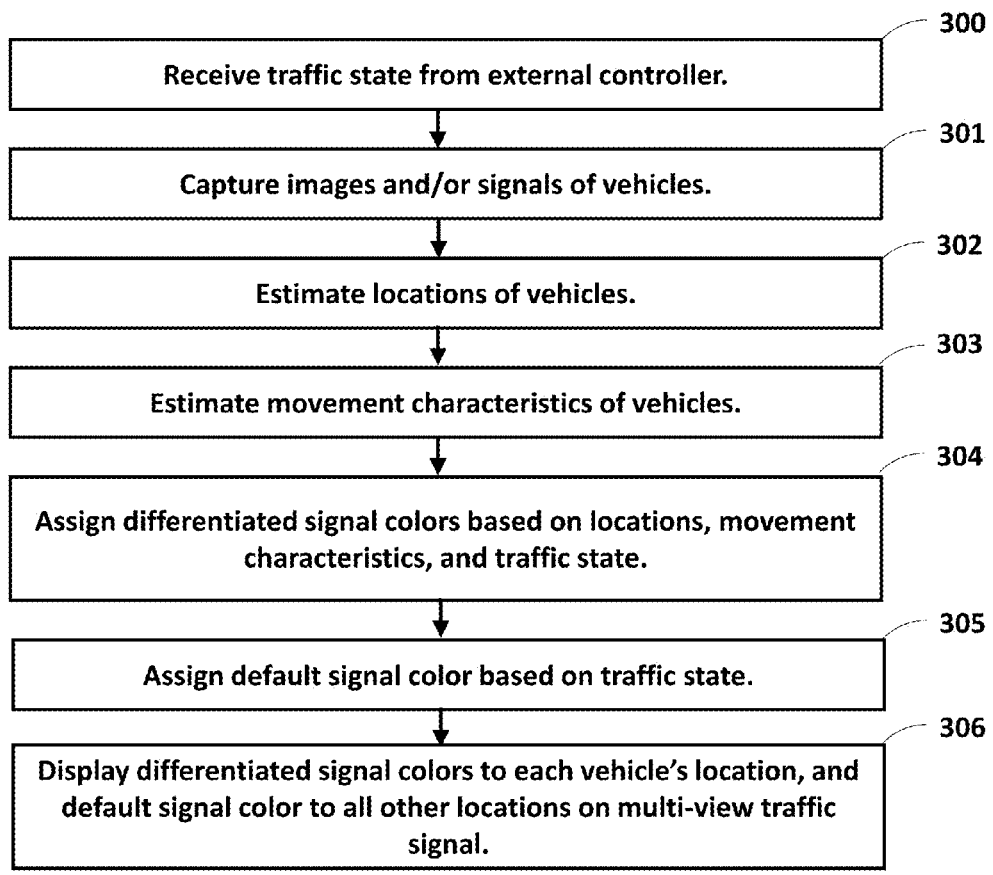
FIG. 3 is an exemplary flow chart demonstrating operation of a multi-view traffic light system (e.g., shown in FIG. 2), according to an embodiment of the invention.

FIG. 3 shows an exemplary flow chart demonstrating operation of a multi-view traffic light system configured to display differentiated signals to each vehicle (e.g., like shown in FIG. 2), according to an embodiment of the invention. It is noted that the exact sequence or order of steps shown in FIG. 3 is not required, so in principle, the various steps may be performed out of the illustrated order. Also certain steps may be skipped, different steps may be added or substituted, or selected steps or groups of steps may be performed in a separate application following the embodiments described herein.

Then, in a method according to this exemplary embodiment, shown in FIG. 3, in a first step 300, an external controller provides a default traffic state. In a next step 301, cameras and/or sensors (one or more sensing devices) may capture images and/or signals (detection data) of a plurality of moving vehicles on the road. From the captured detection data, the computer(s) can estimate locations of individual vehicles. In a next step 303, additional moving characteristics/parameters including (but not be limited to) speeds, accelerations, and/or directions of each individual vehicle may be estimated using a history of captured images and/or the detection data. Moreover, based on the locations, movement characteristics/parameters, and current default traffic state, in step 304, each individual vehicle may be assigned a differentiated signal color. Based on the current traffic state, a default signal color may be assigned in step 305. In a next step 306, the differentiated signal colors may be displayed to each detected vehicle's location or estimated future location on a multi-view traffic display, while the default signal color may be displayed to all other locations. The steps may be repeated to update the detected locations of the vehicles, so that the drivers may continuously see the appropriate signal color. It is noted that alternative permutations, hybrids, orderings, arrangements, and implementations of the process do not depart from the scope of the technique.

It is noted that the flow chart presented in FIG. 3 is complimentary to the general flow chart shown in FIG. 1B, in reference to multi-view traffic lights signage applications. For example, step 301 in FIG. 3 corresponds to step 110 in FIG. 1B, steps 302 and 303 in FIG. 3 correspond to step 112 in FIG. 1B, step 304 in FIG. 3 corresponds to step 114 in FIG. 1B, and step 306 in FIG. 3 corresponds to step 116 in FIG. 1B, respectively.

The assigned color for each vehicle may depend on the vehicle's current movement characteristics, but may also be dependent on the history of assigned colors for that vehicle. For example, it may be desirable for a vehicle to not see red (but to see a standard sequence of yellow and then red) if it has been assigned green, if the vehicle slows down. Alternatively, the assigned color for a vehicle may be dependent upon the assigned colors for other vehicles. For example, it may be desirable to not show green to any vehicles behind a vehicle that is shown red, even if those vehicles are traveling sufficiently fast to pass through the intersection had their travel been unobstructed.

In another example, police and traffic enforcers may wish to see whether or not a vehicle ran a red light that is assigned to it. In this example, one mode of operation may be for the default signal color to follow a standard traffic light progression, i.e., green, then yellow, and then red. The default red signal may be timed to turn on when no other vehicles should pass through the intersection; in other words, all vehicles observing the signal that is default red also see red. The default yellow signal may be used to indicate to a driver that the traffic state is about to switch to red, and some vehicles may be given a green light to pass, while others behind it may be shown red to stop as described herein.

While some operations may omit the yellow signal entirely, a yellow signal may still be used in some cases. For example, if a vehicle, that has been shown green, slows down too much and will not make it across the intersection in a reasonable time period, the multi-view traffic light may direct yellow, followed by red to that vehicle, as with a standard traffic light progression.

It may be desired for traffic lights such as MV traffic lights to not allow a conflicting situation to arise, such as showing green simultaneously to two conflicting directions. Traffic lights often incorporate an independent safety device to detect a conflict (such as that due to component or software failure), and revert the light to a sub-optimal, but safe state such as flashing red in all directions. Safety devices of that kind can be incorporated in MV traffic lights. For example, to make it simple to verify that no green light is present for any vehicle in a given direction, the green signal can be designed so that when the green light is completely off, it shuts down the light source that feeds the imager. This can be verified by an independent light sensor, a current sensor, and/or any suitable means. If the safety system detects a fault, the entire intersection can fall back to an inherently safe configuration, such as flashing red for all directions.

In another embodiment, rather than modifying the traffic light itself, a separate multi-view warning display can be employed to help drivers choose appropriate action when approaching an intersection. This warning display may alert drivers independently if their particular speed and location imply that they should be prepared to stop at the intersection. The warning may consist of illuminated text and/or graphic symbols, and may flash, change color, animate and/or appear in any suitable design so as to alert drivers. It may be desirable to locate the warning display close to the corresponding traffic light, so that they are seen together. If sensors detect that a vehicle is proceeding in an unsafe manner, it can switch to a more urgent display such as flashing more quickly, changing the color, changing the message, or any other method that will increase the chances of a driver noticing the warning. In extreme cases, when it becomes clear that a driver will not be able to stop, the system can purposefully hold the light red in all or conflicting directions to prevent accidents, while also flagging that vehicle for an appropriate fine.

When traffic flow is to be halted in a specific direction, the system may begin warning distant vehicles to be prepared to stop. As the change becomes increasingly imminent, the warning signal may be shown to locations that are increasingly close to the intersection. In a simple implementation, the display can simply roll the display angle of the message location forward based on timing. A limitation of this technique may be that vehicles with vastly different driver heights would cause the message to occur at varying times. A more sophisticated implementation may correct for this error, for example, by using a depth camera or other suitable sensor to determine the ground location, independent of height.

Next, the reader's attention is directed to embodiments related to multi-view speed display signage applications. Speed display signs may be used on roads to provide feedback to drivers about their speeds. These systems may estimate a vehicle's speed using radar or other sensing methods and present messages to the driver, often indicating for the driver to slow down due to exceeding the speed limit. These have been shown to be effective on single-lane roads in convincing drivers to slow down to the speed limit. While it may not be clear which vehicle's speed is being measured and presented, the vehicles are often driving at similar speeds by virtue of being in a single lane.

Standard speed display signs may not be effective on busy multi-lane roads and highways. The typical radar speed vehicular sensing system only reports the speed of the fastest vehicle in range. Even if a multi-vehicle speed sensing technique such as vision-based sensing is employed, the display is shared and drivers would not know if the speed displayed is for their vehicle. Without knowing which vehicle's speed is measured and presented, the message may be largely ignored by most drivers. Further complicating matter is that different vehicle classes or simply different lanes may have different speed limits.

Figure 4:
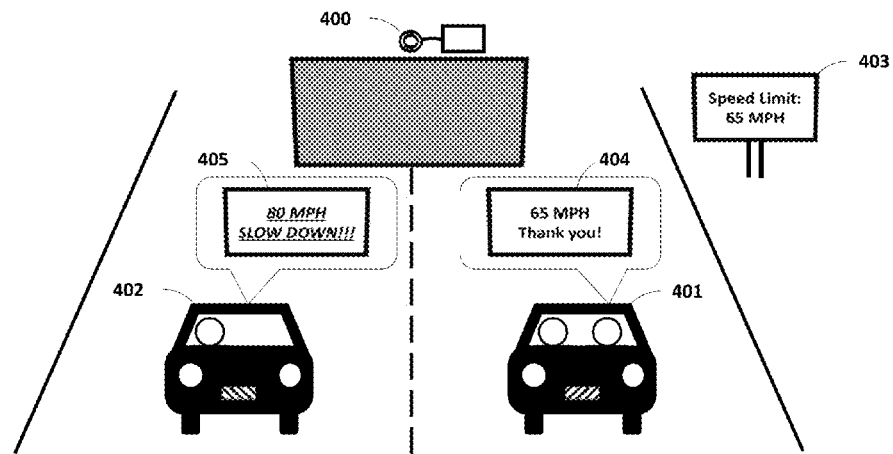
FIG. 4 is an exemplary diagram of a multi-view speed signage system, according to an embodiment of the invention.

According to some embodiments described herein, MV speed display sign systems may simultaneously measure the speed of, and display a relevant message towards, each vehicle on a road. By seeing the speed and an appropriate message for his or her vehicle, a driver may be more strongly induced to follow the speed limit. As depicted in FIG. 4, a multi-view speed sign system 400 may be in view of two vehicles 401 and 402 that are traveling at different speeds. The driver of vehicle 401, traveling at the speed limit (displayed on a side road sign 403), may see a message 404 indicating vehicle's speed, along with a message thanking the driver for driving safely. On the other hand, the driver of vehicle 402, traveling faster than the speed limit, may see a message 405 with a vehicle's speed, along with a message instructing a driver to slow down.

Figure 5:
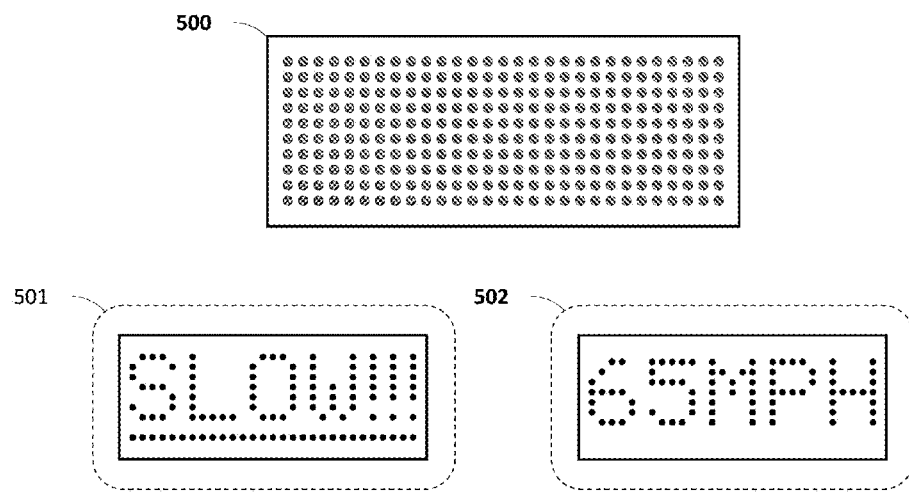
FIG. 5 is an exemplary diagram of a multi-view speed sign using projection elements as pixels, according to an embodiment of the invention.

A multi-view speed sign system may comprise a multi-view display, a computer, and/or a vehicular sensing system (consistent with generalized block diagram in FIG. 1A). The multi-view display may comprise a plurality of projection elements, each forming a pixel of a text or graphic display. As depicted in FIG. 5, a pixel-based multi-view display 500 may allow flexibility in the types of messages that may be presented, such as messages 501 and 502. For example, combinations of letters, numbers, and/or special characters with different fonts, sizes, and/or embellishments may be generated and shown.

Figure 6:
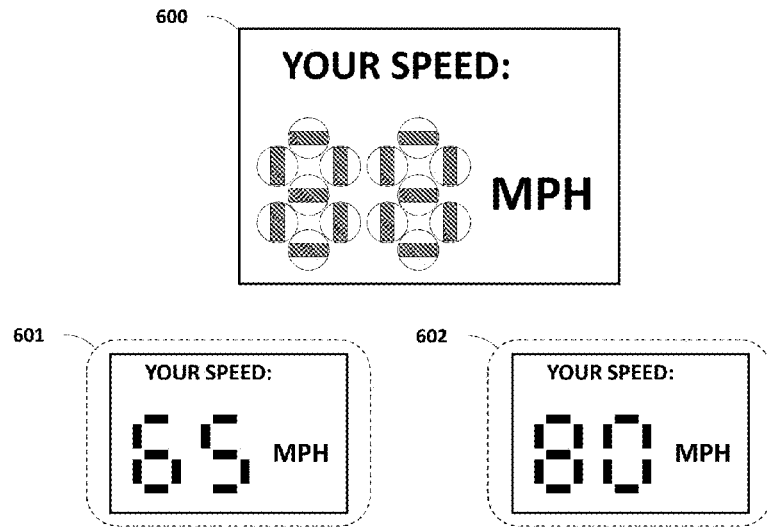
FIG. 6 is a diagram depicting an alternative example embodiment of a multi-view speed sign (e.g., shown in FIG. 4) using masked projection elements as 7-segment displays, according to an embodiment of the invention.

In a further embodiment, a multi-view segmented display may be used. As previously described, segmented displays may reduce the number of projection elements needed to present a message, while reducing the flexibility in the types of messages that may be presented. As depicted in FIG. 6, an exemplary multi-view speed sign 600 may use traditional print and/or displays to broadcast common portions of the message, with a two-character multi-view 7-segment display that simultaneously shows differentiated contents 601 and 602 to different vehicles.

The vehicular sensing system may detect and estimate the speeds and locations of vehicles in the display viewing area. The multi-view display may need to be calibrated to the vehicular sensing system to direct messages to the appropriate vehicles. Exemplary vehicular sensing systems may include, but are not limited to, cameras, radar detectors, laser detectors, microwave emitters, and/or RFID (radio frequency identification). Additionally, the vehicular sensing system may detect other vehicle characteristics, for example, vehicle class, and/or license plate number.

Figure 7:
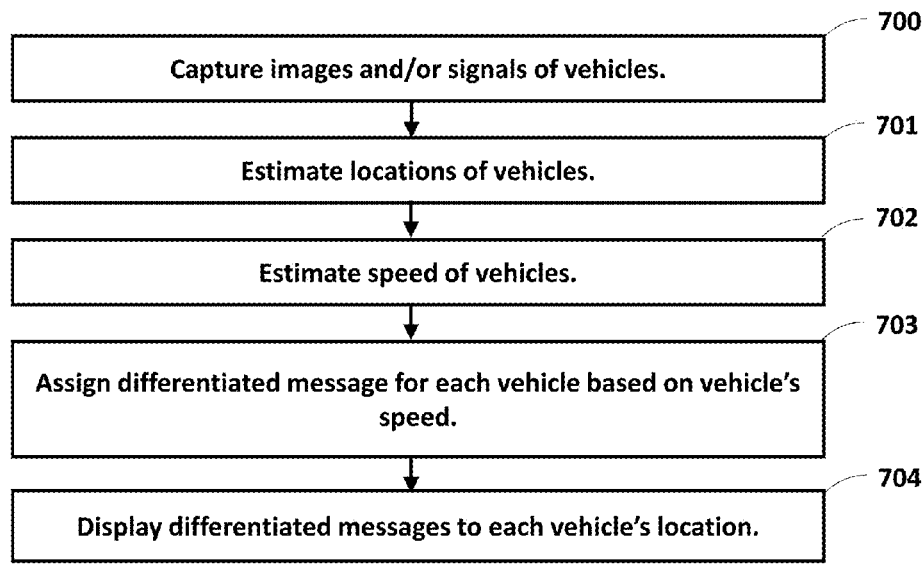
FIG. 7 is an exemplary flow chart demonstrating operation of a multi-view speed signage system (e.g., shown in FIG. 4), according to an embodiment of the invention.

FIG. 7 is an exemplary flow chart demonstrating operation of a multi-view speed signage system (e.g., as shown in FIG. 4), according to an embodiment of the invention, for presenting differentiated messages to a plurality of moving vehicles based on each vehicle's speed. It is noted that the exact sequence or order of steps shown in FIG. 7 is not required so, in principle, the various steps may be performed out of the illustrated order. Also certain steps may be skipped, different steps may be added or substituted, or selected steps or groups of steps may be performed in a separate application according to the embodiments described herein.

For ease of explanation and without limiting the scope of the claimed matter, an exemplary vehicular sensing system may comprise one or more cameras observing the viewing area of the multi-view speed sign. Then, in a method according to this exemplary embodiment, shown in FIG. 7, in a first step 700, the camera(s) may capture images and/or signals of vehicles in the viewing area. In next steps 701 and 702, the computer may process the captured images and/or signals to determine/estimate the locations (step 701) and speeds (step 702) of vehicles in the area. Image processing techniques to estimate locations and speeds of vehicles from captured images are familiar to those with ordinary skill in the art. Exemplary image processing techniques may include, but are not limited to, thresholding, blob detection, motion estimation, optical flow, and/or other techniques. For example, speeds of vehicles may be estimated by computing the distance that each vehicle travels between two consecutive frames and multiplying by the frame rate. From the estimated speeds, each vehicle may be assigned, in step 703 a differentiated message. The differentiated messages may then be displayed in step 704 to each vehicle's location or estimated future location on the multi-view display 704.

It is noted that the flow chart presented in FIG. 7 is complimentary to the general flow chart shown in FIG. 1B, in reference to multi-view speed signage applications. For example, step 700 in FIG. 7 corresponds to step 110 in FIG. 1B, steps 701 and 702 in FIG. 7 correspond to step 112 in FIG. 1B, step 703 in FIG. 7 corresponds to step 114 in FIG. 1B, and step 704 in FIG. 7 corresponds to step 116 in FIG. 1B, respectively.

Alternative speed sensing techniques may not be able to simultaneously detect speeds of multiple vehicles. For example, radar and laser detectors may be only suitable for detecting the speed of a single vehicle at a time. Multiple sensors may be used, for example one for each lane, to measure the speed of multiple vehicles at a time. Because the speeds of vehicles in any one lane may be similar, providing the speed of vehicles in a lane as a whole may be sufficient.

While some speed sensing techniques may provide continuously updated estimates of each vehicle's speed, others may only be able to estimate a vehicle's speed at a single fixed location. For example, a radar detector placed at a particular point on the road may only capture the speed of a vehicle as it passes through that point, and may not be able to provide an updated estimate beyond that point. However, it may be desirable for the multi-view display to continuously display the appropriate message to each vehicle beyond the point at which the speed is estimated.

Figure 8:
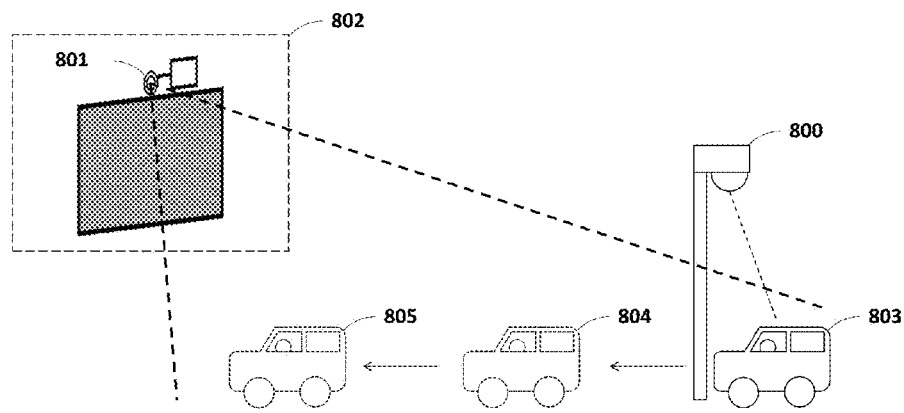
FIG. 8 is a diagram depicting an exemplary system with a speed sensor at a fixed location and a multi-view display system showing content to vehicles beyond that fixed location, according to an embodiment of the invention.

In such a case, for example, as depicted in FIG. 8, a speed sensor 800 at a given location may be paired with a vehicular sensing system 801 in the multi-view display system 802. FIG. 8 is a diagram depicting an exemplary system with a speed sensor at a fixed location and a multi-view display system showing various contents to vehicles beyond that fixed location, according to an embodiment of the invention. As a vehicle 803 passes by the speed sensor 800, its speed is measured and communicated to the multi-view display system. The vehicular sensing system 801 may sense and tag the vehicle 803 as it passes by the speed sensor, and continuously track the vehicle, for example at locations 804 and 805, as it moves beyond the speed sensor 800.

Figure 9:
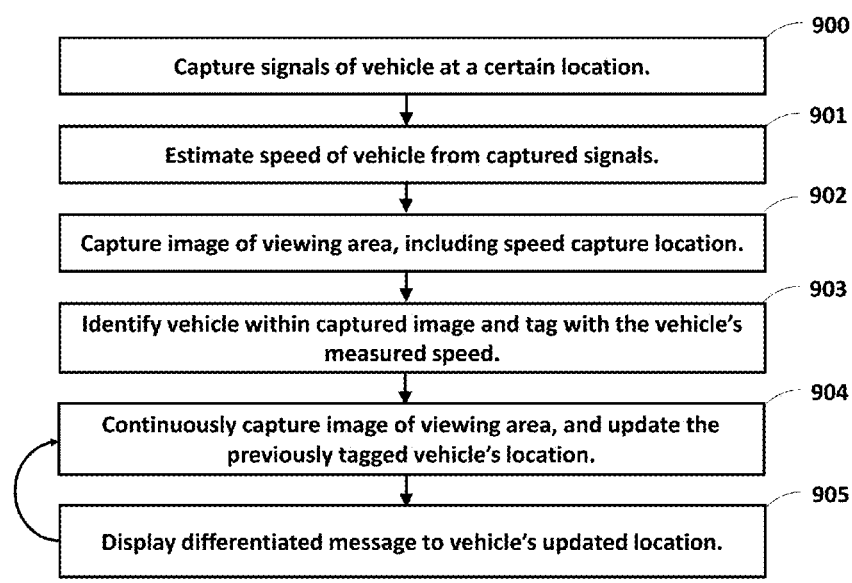
FIG. 9 is another exemplary flow chart demonstrating operation of a multi-view speed signage system (e.g., shown in FIG. 8), according to an embodiment of the invention.

FIG. 9 is another exemplary flow chart demonstrating operation of a multi-view speed signage system (e.g., as shown in FIG. 8), according to an embodiment of the invention, where a vehicle's speed may be captured at a certain location, and a multi-view display may continue to send the appropriate message to the vehicle beyond that location. It is noted that the exact sequence or order of steps shown in FIG. 9 is not required so, in principle, the various steps may be performed out of the illustrated order. Also certain steps may be skipped, different steps may be added or substituted, or selected steps or groups of steps may be performed in a separate application according to the embodiments described herein.

Then, in a method according to this exemplary embodiment, shown in FIG. 9, in a first step 900, a speed sensor captures signals of a vehicle at a certain location. In a next step 901, a computer estimates the speed of the vehicle. In a next step 902, the camera captures an image of the multi-view display's viewing area, including the speed capture location. In next step 903, the vehicle at the speed capture location is identified and tagged with the vehicle's measured speed. In a next step, the camera continuously captures images of the viewing area and updates the locations of previously tagged vehicles 904. Then in a step 905, the appropriate message may be presented to the vehicle's updated location on the multi-view display. Steps 904 and 905 may be repeated until the vehicle exits the viewing area.

It is noted that the flow chart presented in FIG. 9 is complimentary to the general flow chart shown in FIG. 1B, in reference to a further multi-view speed signage applications. For example, steps 900 and 902 in FIG. 9 correspond to step 110 in FIG. 1B, steps 901 and 903 in FIG. 9 correspond to step 112 in FIG. 1B, step 904 in FIG. 9 corresponds to steps 110 and 112 in FIG. 1B, and step 905 in FIG. 9 corresponds to steps 114 and 116 in FIG. 1B, respectively.

It is noted that techniques to identify, tag, and update the locations of vehicles in images are familiar to those with ordinary skill in the art. For example, the appearance of vehicles between successive camera frames may be correlated to associate a vehicle in a new frame with a tagged vehicle in a previous frame. In another example, the location of a vehicle within a new frame may be predicted by modeling the movement of the vehicle from previous frames.

Next, multi-view vehicle classification signage applications are discussed. Commercial vehicles may often be subject to different traffic regulations than passenger vehicles on the same road. For example, on highways, commercial vehicles are often instructed to take a certain exit, while passenger vehicles are instructed to take other exits. Trucks may be instructed to enter a weigh station. Commercial vehicles and passenger vehicles may also be regulated by different speed limits. Standard traffic signage typically only broadcasts information to all viewers, requiring multiple sets of signage for passenger vehicles and commercial vehicles. Thus, there may be signage that is irrelevant to entire classes of vehicles and those drivers may need to consciously ignore such irrelevant signage.

Multi-view traffic signage may direct one set of information to vehicles of a certain class while simultaneously directing a different set of information to vehicles of a different class. By presenting only information that is relevant to each class of vehicle, such signage may reduce the clutter of irrelevant information that drivers see but need to ignore.

Figure 10:
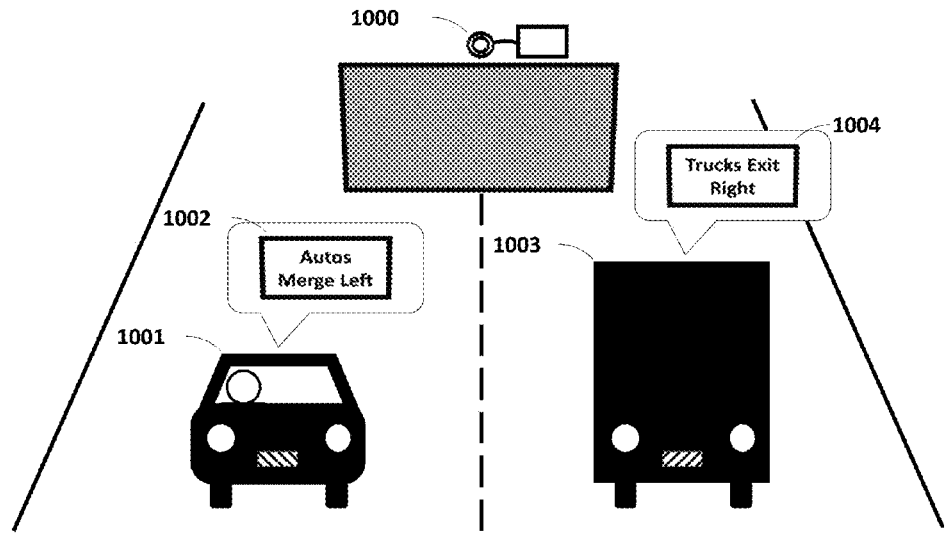
FIG. 10 is an exemplary diagram of a multi-view vehicle classification signage system, according to an embodiment of the invention.

FIG. 10 shows an exemplary diagram of a multi-view vehicle classification signage system, according to an embodiment of the invention. As depicted in FIG. 10, a multi-view traffic signage system 1000 above a highway may direct a message 1002 to a passenger vehicle 1001 instructing it to merge left. Simultaneously, the system may direct a message 1004 to a commercial truck 1003 instructing it to exit right. The two vehicles each only see the message relevant to its own vehicle class, preventing confusion that might occur if all messages were visible.

A vehicular sensing system may be used to estimate the location of and classify different vehicles. An exemplary vehicular sensing system may comprise a camera and/or license plate reader. Since commercial vehicles typically have a label indicating its classification on their license plates, a typical license plate reader may be able to classify vehicles appropriately. Alternatively, a license plate reader may capture a vehicle's license plate number, and a system computer may look up the vehicle classification from a database of vehicle information. In yet another example, the system may capture images and perform visual analysis of the vehicles, classifying each vehicle as a passenger automobile, bus, truck, or the like. Different vehicular sensing systems for classifying vehicles may include, but are not limited to, RFID readers, treadles, inductive sensors, and/or light-curtain laser profilers.

Figure 11:
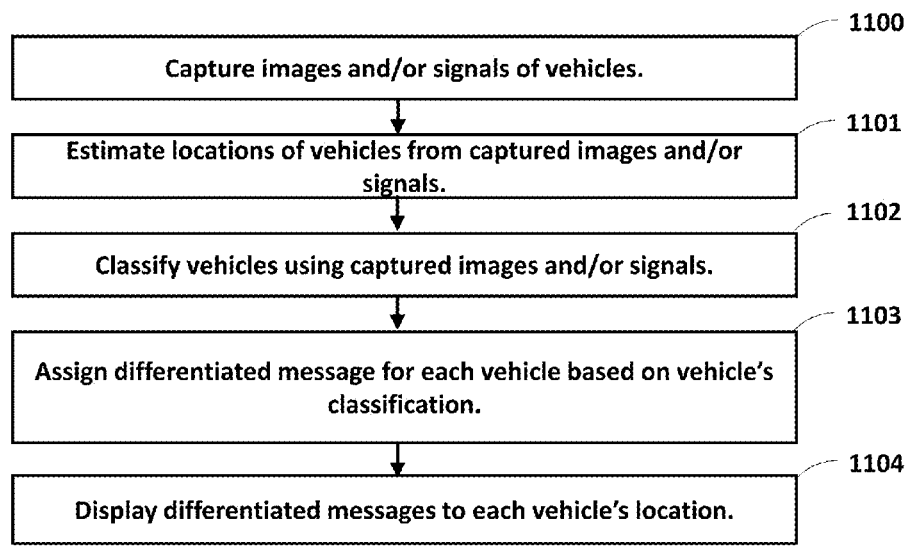
FIG. 11 is an exemplary flow chart demonstrating operation of a multi-view vehicle classification system (e.g., shown in FIG. 10), according to an embodiment of the invention.

FIG. 11 depicts an exemplary flow chart demonstrating operation of a multi-view vehicle classification system (e.g., like that shown in FIG. 10), according to an embodiment of the invention. It is noted that the exact sequence or order of steps shown in FIG. 11 is not required, so in principle, the various steps may be performed out of the illustrated order. Also certain steps may be skipped, different steps may be added or substituted, or selected steps or groups of steps may be performed in a separate application following the embodiments described herein.

Then, in a method according to this exemplary embodiment, shown in FIG. 11 in step 1100, a vehicular sensing system captures images and/or signals of vehicles in the display's viewing area. In a next step 1101, a computer estimates locations of the vehicles from the captured images and/or signals, and in a following step 1102 the vehicles are classified. In a next step 1103, the computer further differentiates messages assigned to each vehicle based on its classification. In a next step 1104, differentiated messages are displayed on the EMVD to each vehicle's location.

It is noted that the flow chart presented in FIG. 11 is complimentary to the general flow chart shown in FIG. 1B, in reference to multi-view vehicle classification signage applications. For example, step 1100 in FIG. 11 corresponds to step 110 in FIG. 1B, steps 1101 and 1102 in FIG. 11 correspond to step 112 in FIG. 1B, step 1103 in FIG. 11 corresponds to step 114 in FIG. 1B, and step 1104 in FIG. 11 corresponds to step 116 in FIG. 1B respectively.

Similar to the case depicted in FIG. 8, classification of vehicles may be performed at a fixed location, while the multi-view display is continuously directing messages to the vehicles beyond that location. A classification vehicular sensing system may be paired with another vehicular sensing system (e.g., camera) for identifying, tagging, and updating the locations of vehicles as they travel beyond the location of classification.

It is noted that many different classifications may be used. Examples include, but are not limited to, passenger, commercial, make, model, color, body type, height, government, medical emergency, specially authorized and the like.

Next, multi-view toll signage applications are discussed. Electronic toll collection is commonly employed on highways and roads. Typically, as a vehicle passes through a tollgate, sensors may read an ID tag or the license plate on the vehicle and bill the owner of the vehicle for the toll amount. Often, toll collection systems allow drivers to have toll accounts that they maintain with a positive balance, from which toll fees are automatically extracted. Driving through a tollgate, a driver may wish to receive feedback regarding the charged amount and/or the balance remaining on his or her toll account. While individual displays for each toll lane may be used to provide such feedback, quite often the viewing area for such a display is so small that a vehicle quickly passes by without enough time to read and interpret the information. It may be desirable for a larger display in the distance to present such information, allowing enough time for a driver to read and comprehend the message.

Figure 12:
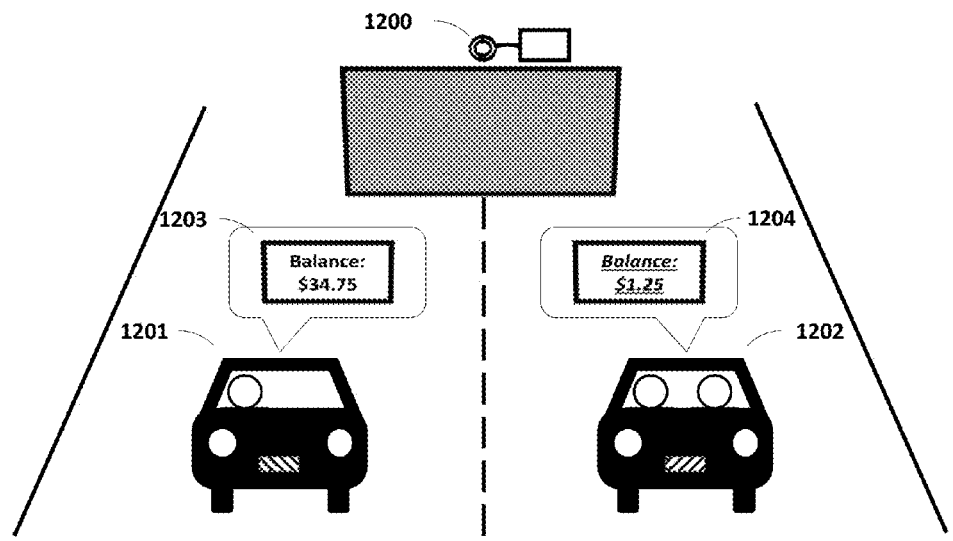
FIG. 12 is an exemplary diagram of a multi-view toll signage system, according to an embodiment of the invention.

Multi-view toll signage may be used to individually direct toll information to each vehicle on a road. FIG. 12 shows an exemplary diagram of a multi-view toll signage system, according to an embodiment of the invention. As depicted in FIG. 12, a multi-view display system 1200 over a road may simultaneously direct different toll account messages to two vehicles 1201 and 1202. Vehicle 1201 may receive a message 1203 indicating its toll account balance, while vehicle 1202 may receive a message 1204 formatted to warn the driver of a low account balance.

Figure 13:
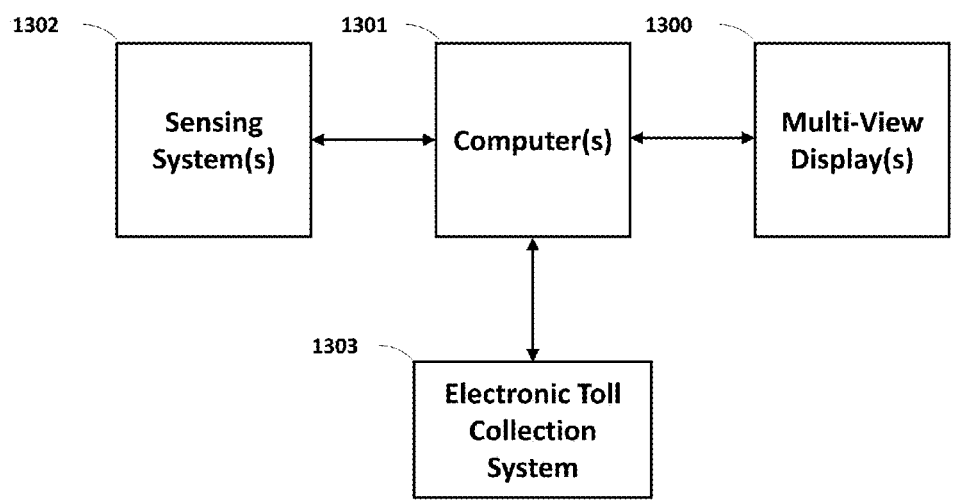
FIG. 13 is an exemplary block diagram demonstrating operation of a multi-view toll signage system (e.g., shown in FIG. 12), according to an embodiment of the invention.

FIG. 13 shows an exemplary block diagram demonstrating operation of a multi-view toll signage system (e.g., shown in FIG. 12), according to an embodiment of the invention As depicted in FIG. 13, the multi-view toll signage system may comprise one or multi-view displays 1300, one or more vehicular sensing systems 1302, and one or more computers 1301 that communicate with an electronic toll collection system 1303.

Typically, electronic toll collection systems communicate with vehicles at a fixed location. As with the scenario depicted in FIG. 8, an electronic toll collection system may communicate with the vehicular sensing system (e.g., a camera) on the multi-view display to identify, tag, and continue tracking vehicles beyond the electronic toll collection location.

A multi-view toll signage system may not have to be paired with an electronic toll collection system. Alternatively, a multi-view toll signage system may display individualized toll information to each vehicle without collecting toll. In this case, the vehicular sensing system(s) in the multi-view display system may identify each vehicle and communicate with an external computer to look up vehicle toll account information and optionally other related information for a vehicle, such as vehicle's registration expiration date and the like. Examples of vehicular sensing systems to identify vehicles may include, but are not limited to, RFID readers, license plate readers, optical barcode scanners, Wi-Fi, Bluetooth, and/or NFC (near field communication).

Next, multi-view lane-specific signage applications are discussed. On a multi-lane road, it is common for drivers in different lanes to adhere to different regulations, instructions, or warnings. For example, high-occupancy vehicle lanes may be restricted to vehicles with more than one occupant. Construction may occur in a particular lane, requiring vehicles in that lane to merge into an adjacent lane. Speed limits may differ between different lanes. Hazards, debris, uneven pavement, and/or other conditions may apply only to certain lanes. Shoulder activity and ramp activity may only affect the outermost lane.

Typically, traditional signage that is visible to all drivers is used to relay such information, requiring each driver to read and judge whether or not a sign is applicable to his or her lane. Multi-view lane-specific signage may simultaneously present different contents to vehicles in different lanes, allowing each driver to see the content only relevant to his or her lane.

Figure 14:
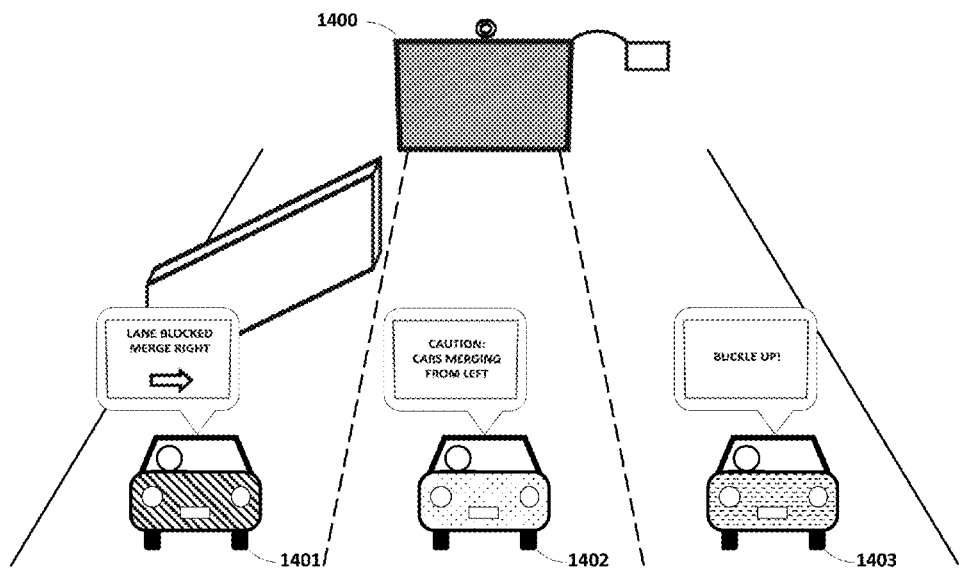
FIG. 14 is an exemplary diagram of a multi-view lane-specific signage system, according to an embodiment of the invention.

FIG. 14 shows an exemplary diagram of a multi-view lane-specific signage system, according to an embodiment of the invention. As depicted in FIG. 14, vehicles in each of three lanes may simultaneously see different messages on a multi-view display system 1400. Construction is blocking the left-most lane, so vehicle 1401 in that lane sees a message instructing it to merge to the right. Vehicle 1402 in the middle lane, meanwhile, sees a message warning that vehicles are merging in from the left lane. Vehicle 1403, in a lane that is minimally impacted by the construction, sees a generic message to buckle seatbelts.

When the content is purely location-dependent, a calibrated multi-view display system may not need a vehicular sensing system. If vehicles in different lanes approximately see the multi-view display from different angles, then the multi-view display contents may simply be designed to direct the contents at those angles (i.e., as for the case of non-moving objects, which is not discussed herein).

Figure 15:
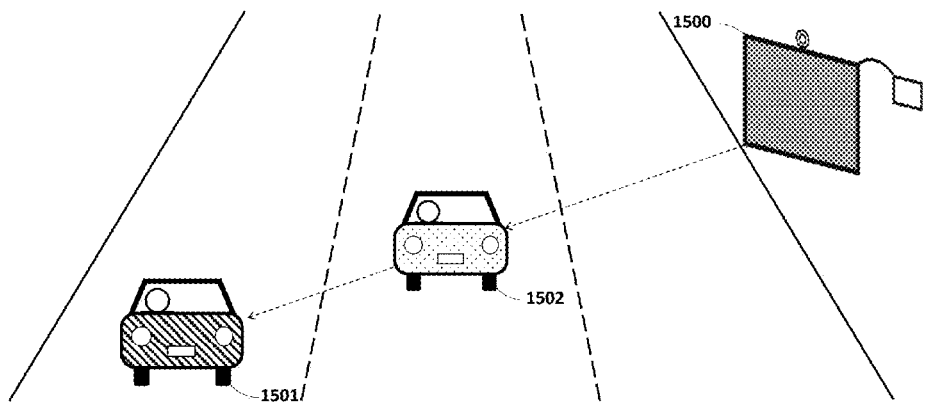
FIG. 15 is another exemplary diagram of a multi-view lane-specific signage system depicting multiple vehicles with the same viewing angle, according to an embodiment of the invention.

However, if a multi-view display is positioned such that vehicles in different lanes may share the same viewing angle, then a depth vehicular sensing system may be used to determine which version of content to direct at that angle. FIG. 15 shows an exemplary diagram of a multi-view lane-specific signage system depicting multiple vehicles with the same viewing angle, according to an embodiment of the invention. As depicted in FIG. 15, a multi-view display system 1500 may be placed such that a vehicle 1502 may occlude a vehicle 1501. Thus, different lanes in this case may not necessarily correspond directly to different viewing angles. Then a vehicular sensing system in the multi-view display system may estimate a depth map of the viewing area to determine which versions of content to direct to the vehicles 1502 and 1501.

Next, multi-view navigational signage systems are discussed. Drivers typically rely on navigational devices to provide real-time directions to their destinations. Directions may be presented on a separate device mounted to the windshield or dashboard, a heads-up display in the windshield, a screen embedded in the dashboard, or a smartphone or other mobile device. Using such devices requires the driver to correlate the graphics and instructions on the interface with the environment. For example, a common navigational technique is to instruct the driver to turn in several hundred feet. However, on streets with closely spaced crossroads, it may be difficult for a driver to gauge exactly which turn the instruction is referring to.

Figure 16:
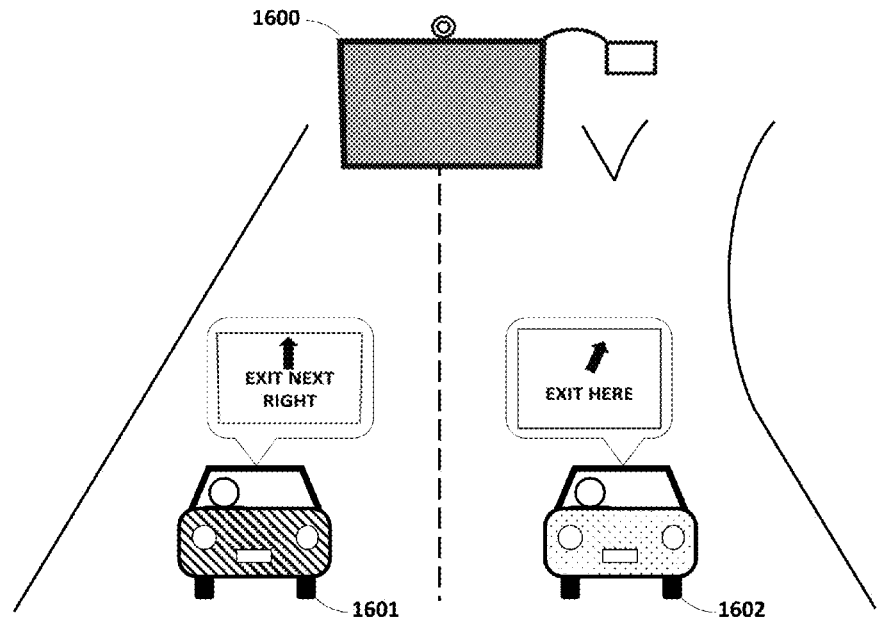
FIG. 16 is an exemplary diagram of a multi-view navigational signage system, according to an embodiment of the invention.

Navigational instructions may be presented using multi-view navigational signage placed in the environment, allowing a driver to more easily comprehend the directions. For instance, FIG. 16 shows an exemplary diagram of a multi-view navigational signage system, according to an embodiment of the invention. As depicted in FIG. 16, a multi-view display system 1600 may simultaneously present different navigational instructions to two vehicles 1601 and 1602. Vehicle 1601, traveling to a destination at the next exit, is instructed by the sign to go straight and exit at the next right. Vehicle 1602, traveling to a destination at the current exit, is instructed by the sign to exit immediately.

Figure 17:
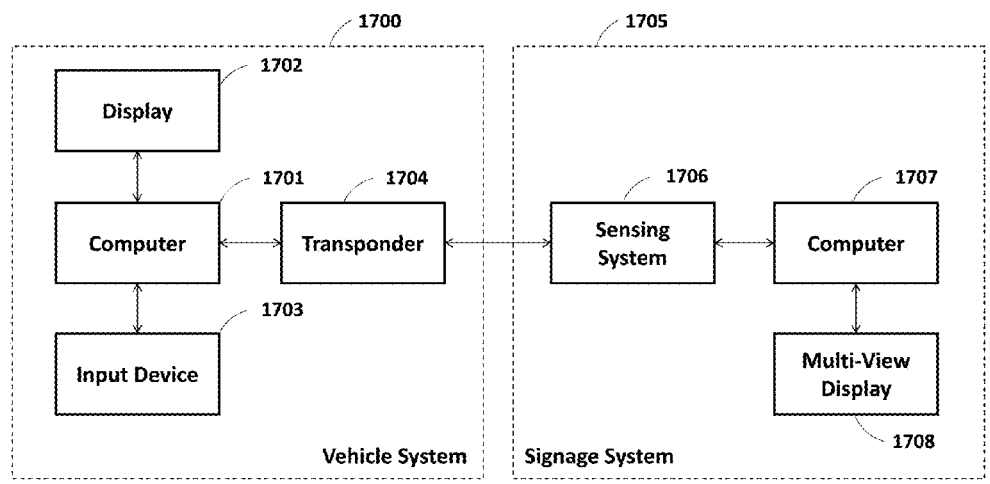
FIG. 17 is an exemplary block diagram demonstrating operation of a multi-view navigational signage system (e.g., shown in FIG. 16), according to an embodiment of the invention.

FIG. 17 is an exemplary block diagram demonstrating operation of a multi-view navigational signage system (e.g., shown in FIG. 16), according to an embodiment of the invention. As depicted in FIG. 17, each vehicle may be equipped with a system 1700 comprising a computer 1701, a display 1702, and an input device 1703 presenting an interface for a driver/occupant to select the desired destination. The vehicle system computer may communicate with a transponder 1704 to transmit desired destination information to the signage system 1705, comprising a vehicular sensing system 1706, a computer 1707, and a multi-view display 1708. Another possible scenario is that the vehicle system can comprise a smartphone (phone application), and the phone can be sensed during travel or it senses and reports its position and other relevant navigation information to the multi-view navigational signage system.

Figure 18:
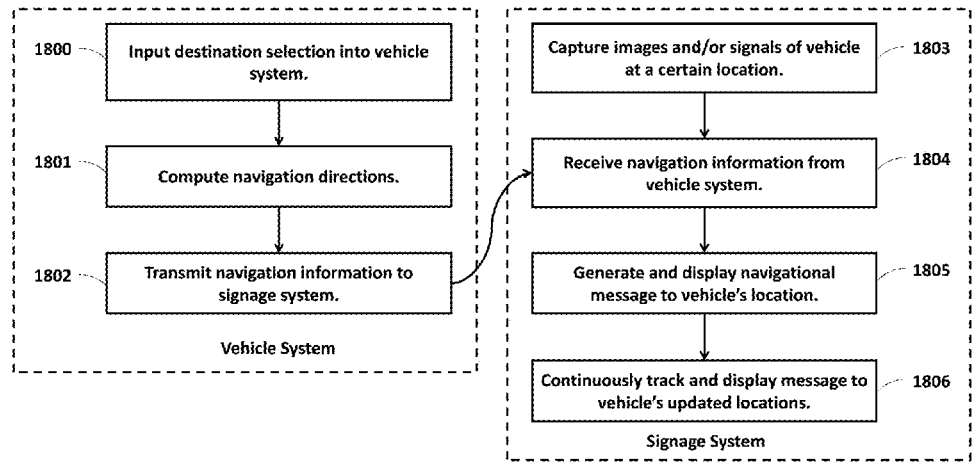
FIG. 18 is an exemplary flow chart demonstrating operation of a multi-view navigational signage system (e.g., as shown in FIGS. 16 and 17), according to an embodiment of the invention.

FIG. 18 is an exemplary flow chart demonstrating operation of a multi-view navigational signage system (e.g., as illustrated in FIGS. 16 and 17), according to an embodiment of the invention. FIG. 18 depicts a case in which a vehicle system and multi-view navigational signage system communicate to present differentiated navigational information to vehicles. It is noted that the exact sequence or order of steps shown in FIG. 18 is not required, so in principle, the various steps may be performed out of the illustrated order. Also certain steps may be skipped, different steps may be added or substituted, or selected steps or groups of steps may be performed in a separate application according to the embodiments described herein.

Then, in a method according to this exemplary embodiment, shown in FIG. 18, in a first step 1800, a user selects a destination using the vehicle system interface. In next steps

1801 and 1802, the vehicle system computes the navigational directions in step 1801, and transmits the navigational information to the signage system in step 1802 respectively. In a next step 1803, sensors capture images and/or signals of the vehicle at a certain sensing location. In a next step 1804, the signage system receives the navigational information from the vehicle system. In a next step 1805, a computer generates a corresponding navigational message, so that the generated message then displayed on the EMVD the vehicle's location. In step 1806, sensors continue tracking and updating the vehicle's location so as to continuously display the navigational message to the vehicle.

It is noted that the flow chart presented in FIG. 18 is complimentary to the general flow chart shown in FIG. 1B, in reference to multi-view navigational signage applications. For example, steps 1803 and 1804 in FIG. 18 corresponds to step 110 in FIG. 1B, step 1805 in FIG. 18 corresponds to steps 112, 114 and 116 in FIG. 1B, and step 1806 in FIG. 18 corresponds to steps 110, 112, 114 and 116 in FIG. 1B, respectively.

The signage system in the aforementioned example may utilize a vehicular sensing system at a fixed location to communicate with transponders in vehicles, as in the case of FIG. 8. Exemplary technologies (which can be used) may include, but are not limited to, RFID readers, Bluetooth beacons, and/or optical sensors observing the fixed location. An alternative exemplary embodiment may include a transponder and vehicular sensing system that continuously communicate. In such an embodiment, the vehicular sensing system may simultaneously communicate with the transponder and estimate its location, allowing the multi-view display system to simply direct the appropriate content to the location of the transponder. Then examples of technologies which can be used may include, but are not limited to, RFID tracking, Wi-Fi, and/or camera systems.

It is noted that the multi-view navigational sign may be embedded into standard street signs, so that unregistered or unrelated vehicles may still see the standard street sign, but only registered vehicles may see the relevant navigational messages. The multi-view content may take many forms including, but not limited to, text, arrows, graphics, and/or highlights.

Next, multi-view active merging signage applications are discussed. Multi-view signage may be used to aid vehicles in active merging, providing instructions to facilitate traffic flow. An example situation where this may be helpful is a highway on-ramp where vehicles need to merge onto highway traffic.

Figure 19:
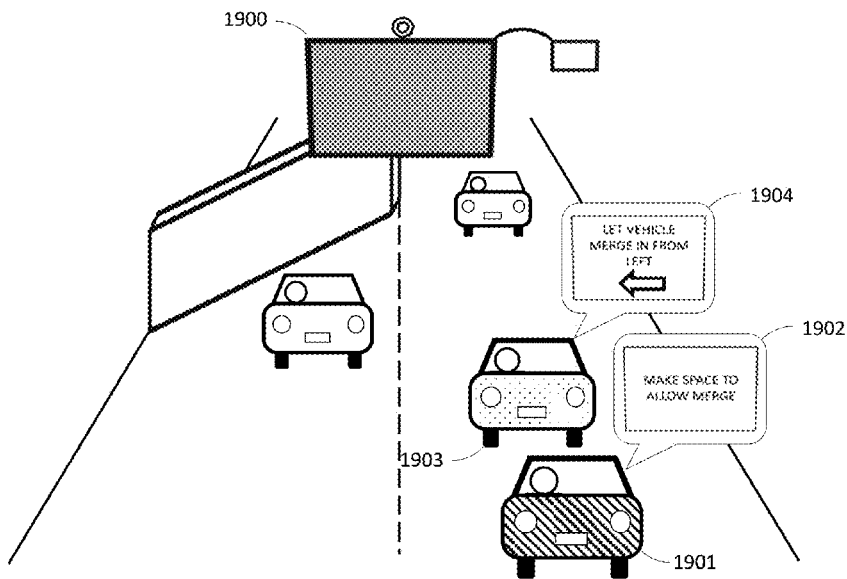
FIG. 19 is an exemplary diagram of a multi-view active merging signage system, according to an embodiment of the invention.

FIG. 19 is another exemplary diagram of a multi-view active merging signage system, according to another embodiment of the invention. As depicted in FIG. 19 is where construction or some other obstruction blocks a lane, requiring vehicles in that lane to merge into the adjacent lane. A multi-view display system 1900 may present situational messages to different vehicles, improving the flow of traffic. Vehicle 1901, following too close to the vehicle in front of it to allow a safe merge, may be shown a message 1902 instructing the driver to make space. Simultaneously, vehicle 1903 may be shown a message 1904 to allow the vehicle on the left to merge in.

Figure 20:
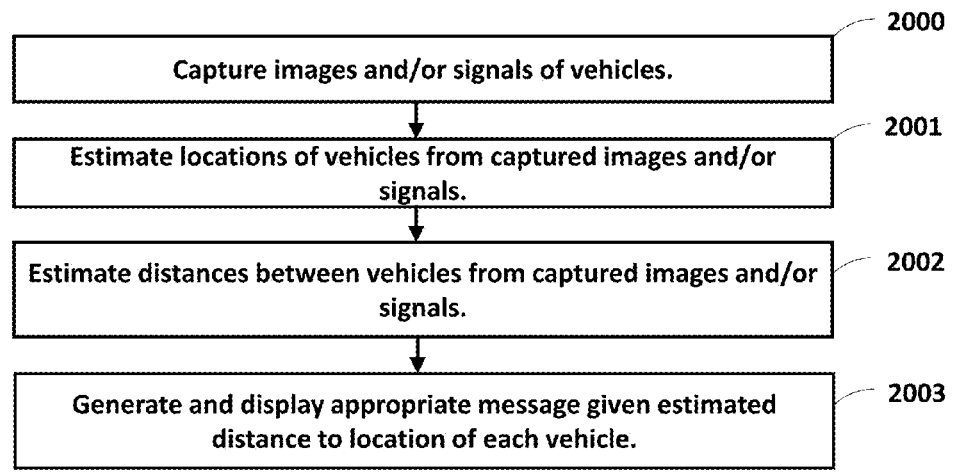
FIG. 20 is an exemplary flow chart demonstrating operation of a multi-view active merging signage system (e.g., as shown in FIG. 19), according to an embodiment of the invention.

FIG. 20 is an exemplary flow chart demonstrating operation of a multi-view active merging signage system (e.g., as shown in FIG. 19), according to an embodiment of the invention. In FIG. 20, a multi-view active merging signage system may direct differentiated merging instructions to each vehicle based on its following distance. It is noted that the exact sequence or order of steps shown in FIG. 20 is not required, so in principle, the various steps may be performed out of the illustrated order. Also certain steps may be skipped, different steps may be added or substituted, or selected steps or groups of steps may be performed in a separate application following the embodiments described herein.

Then, in a method according to this exemplary embodiment, shown in FIG. 20, in a first step 2000, a vehicular sensing system captures images and/or signals of the vehicles within view of the EMVD. In a next step 2001, the computer, based on the captured images and/or signals, estimates the locations and/or moving characteristics of the vehicles. Then in a step 2002, the computer further estimates parameters such as distances between the vehicles in each lane. In a next step 2003, appropriate messages are generated and displayed on the EMVD to each vehicle's location based on estimated parameter values.

It is noted that the flow chart presented in FIG. 20 is complimentary to the general flow chart shown in FIG. 1B, in reference to multi-view active merging signage applications. For example, step 2000 in FIG. 20 corresponds to step 110 in FIG. 1B, steps 2001 and 2002 in FIG. 20 correspond to step 112 in FIG. 1B, and steps 2003 in FIG. 20 corresponds to steps 114 and 116 in FIG. 1B respectively.

The vehicular sensing system of the multi-view display system may estimate the locations and/or movement characteristics of each vehicle. Exemplary vehicular sensing systems may include, but are not limited to camera arrays and/or depth sensors. Messages may depend on further factors other than following distance, including but not limited to speed, acceleration, turning signals, and/or merge intent.

Next, multi-view cruising warning signage applications are discussed. In high-density locations such as cities and downtown areas, parking spaces around popular destinations may be limited. Vehicles looking to park near a destination may often cruise around a block many times, hoping for a space to open up. This often causes unnecessary traffic congestion, noise, and/or pollution. A multi-view cruising warning signage system may detect cruising activity and present messages specifically to cruising vehicles to deter such behavior.

Figure 21:
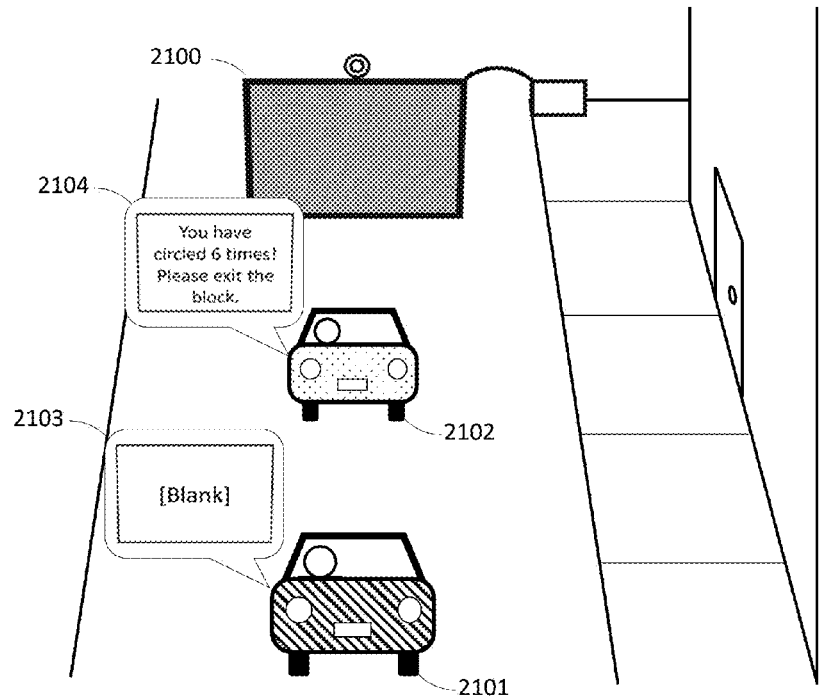
FIG. 21 is an exemplary diagram of a multi-view cruising warning signage system, according to an embodiment of the invention.

FIG. 21 is an exemplary diagram of a multi-view cruising warning signage system, according to an embodiment of the invention. As depicted in FIG. 21, a multi-view display system (EMVD) 2100 may be in view of two vehicles circling a block in a city. One vehicle 2101 has circled the block only once, while the other vehicle 2102 has circled the block six times. Sensors in the multi-view display system can detect and count the number of times each vehicle has circled around the block. No message 2103 is presented to the vehicle 2101, which has circled the block only once, while a warning message 2104 is presented to the vehicle 2102, which has circled too many times.

The vehicular sensing system may detect and identify vehicles driving around the block. In one exemplary embodiment, transponder RFID readers and tags, such as those used for the electronic toll collection application, may be used. An alternative embodiment may comprise a license plate reader to identify and track vehicles. The vehicular sensing system may be placed at the EMVD, or it may be deployed in other locations. Multiple systems may be used; for example, a camera may track vehicle locations, while a RFID tag reader may identify vehicles. Alternatively, a single vehicular sensing system may be used, where a camera, for example, may simultaneously track vehicle locations and read vehicle license plates for identification.

The cruising warning may include an automatic ticketing system. The warning sign can then also indicate when a ticket has been issued, and for how much. To improve enforcement, it may be desirable to have tiered ticketing in which the penalty for cruising increases with continuing violation. For example, the fourth time passing a location in one hour may incur a small fine, the fifth time, a larger fine, followed by a hefty fine for the sixth time. Having a sign that can explain the increasing penalty may be a strong inducement for immediate compliance with regulations.

Next, multi-view clearance signage applications are discussed. Bridges and overpasses may not allow vehicles above a certain height (infrastructure clearance height) to pass, or else significant damage to the vehicle and/or infrastructure may occur. Typically, this information is displayed with signage indicating the maximum height allowed. However, situations can occur where a driver may attempt to drive an oversized vehicle under the infrastructure. For example, the driver may not have measured the vehicle's height beforehand. The infrastructure may have deformed over time due to constant stress. In such situations, a system, which can measure the height of and display a message to each vehicle, may be desired.

Figure 22:
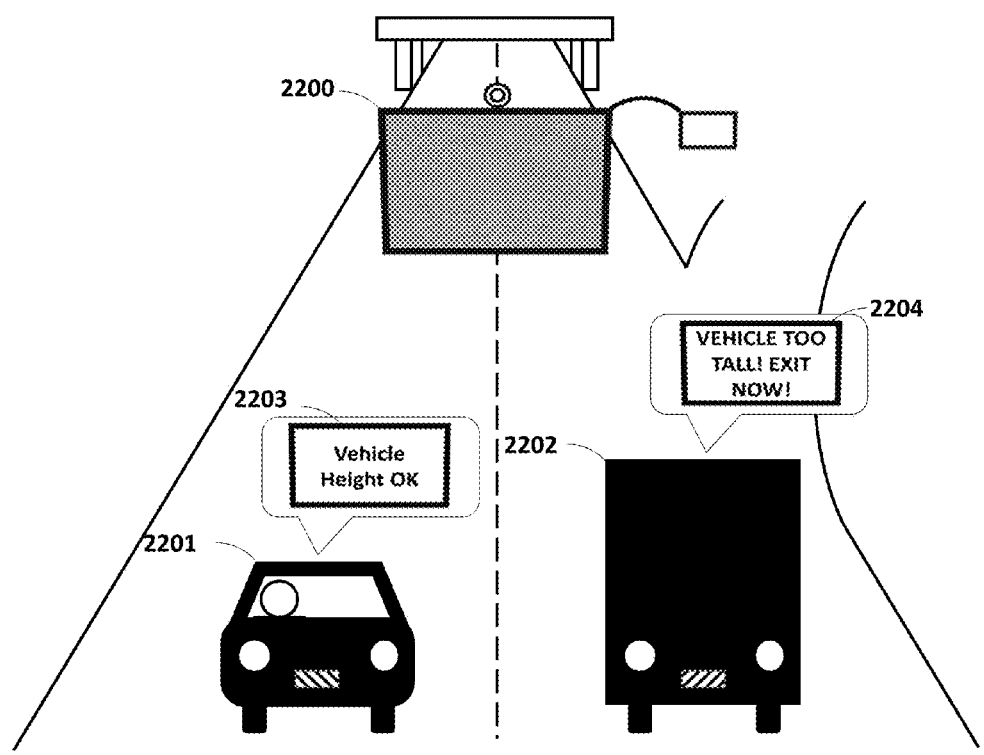
FIG. 22 is an exemplary diagram of a multi-view clearance warning signage system, according to an embodiment of the invention.

FIG. 22 shows an exemplary diagram of a multi-view clearance warning signage system, according to an embodiment of the invention As depicted in FIG. 22, a multi-view display system 2200 may be in view of a passenger vehicle 2201 and a truck 2202, driving towards a bridge up ahead. The passenger vehicle may safely pass under the bridge, so it is shown a message 2203 indicating so. The truck, meanwhile, may be too tall to pass safely, so it is shown a message 2204 indicating that it should exit immediately.

The multi-view clearance signage system may utilize a vehicular sensing system to detect vehicle heights. In one embodiment, the vehicular sensing system may be a depth sensor that estimates a depth map of the environment, identifying vehicles that are too tall to pass. The same vehicular sensing system may be used to calibrate the multi-view display and direct content towards individual vehicles. In an alternative embodiment, one or more separate vehicular sensing systems may be used. For example, a light-curtain laser profiler may be used to measure vehicle heights, while a camera or depth sensor may allow the multi-view display to direct different messages to specific locations.

Next, multi-view parking signage applications are discussed. In crowded parking lots and/or structures, it may be difficult for drivers to quickly identify and navigate to open parking spaces. If standard signage systems are used to indicate directions to an open space, all vehicles within view receive the same instructions, possibly resulting in multiple vehicles racing to the single open slot. A multi-view parking signage system may be used to individually direct each vehicle to different open parking spots. Such a system may reduce the amount of circling in parking areas, as well as the time it takes for drivers to find an open spot.

Figure 23:
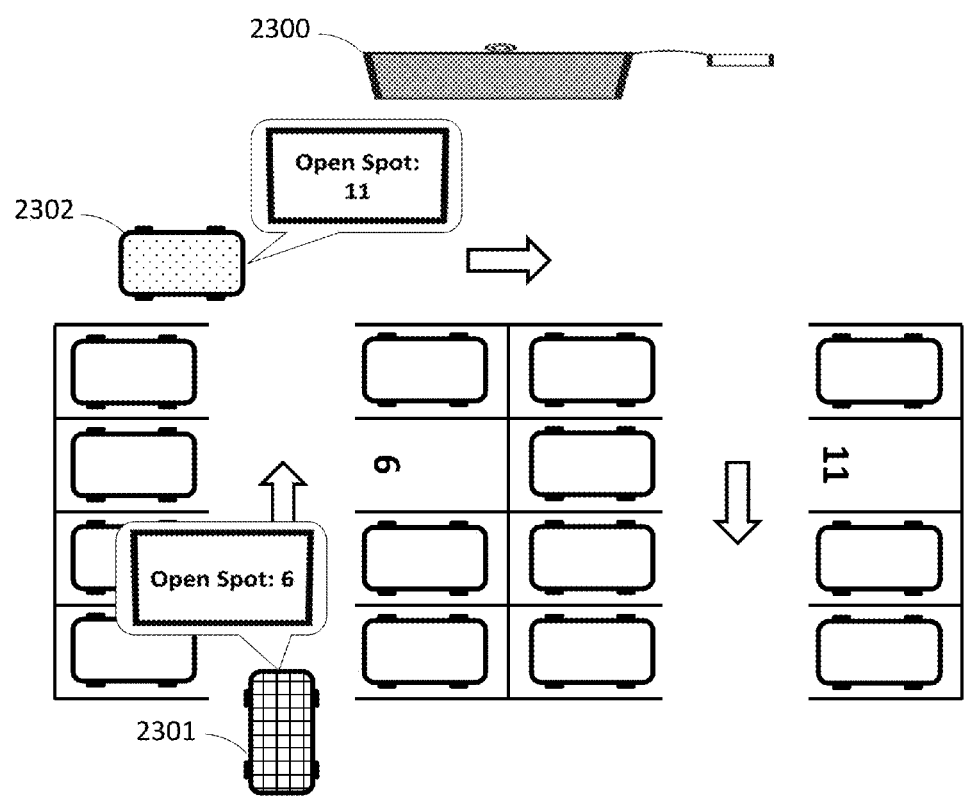
FIG. 23 is an exemplary diagram of a multi-view parking signage system, according to an embodiment of the invention.

FIG. 23 shows an exemplary diagram of a multi-view parking signage system, according to an embodiment of the invention. As depicted in FIG. 23, a multi-view display system 2300 may be in view of vehicles in a crowded parking lot, include vehicles 2301 and 2302. Vehicle 2301, already in an aisle with an open spot, is directed by the multi-view sign to occupy that spot. Meanwhile, vehicle 2302 is directed by the sign to occupy a spot in a different aisle.

The multi-view parking signage system may utilize sensors to detect open spots in a parking area. An exemplary embodiment may comprise individual sensors in each parking space. Such sensors may include, but are not limited to, magnetic sensors, infrared sensors, optical sensors, and/or inductive sensors. Alternative embodiments may comprise cameras that view and detect open parking spaces.

In one exemplary embodiment, a system may direct each vehicle to the nearest open parking spot. However, in cases of conflict, the system may attempt to optimally assign parking spots to each vehicle. Assignment criteria may include, but are not limited to, shortest travel distance, vehicle size, vehicle weight, and/or vehicle classification. In private parking structures, preference might be given to certain customers to provide them with better parking options, or to direct them to spots closer to their presumed destinations, and/or to a special section for a specific vehicle class such as compact car section, non-compact car section, residential section, non-residential section, etc.

Applicable parking areas may include, but are not limited to, parking lots, parking lanes, parallel parking spaces, and/or multi-level parking structures. Multiple multi-view displays may be placed at various locations, for example at each aisle or each level. An alternative embodiment of a system may allow a user to manually select the messages for presenting to each vehicle. For example, a parking attendant may wish to direct different vehicles in different directions. An interface on a computing device may show a camera feed of the parking structure, and the attendant may be able to select different messages for different vehicles using such an interface.

Figure 24:
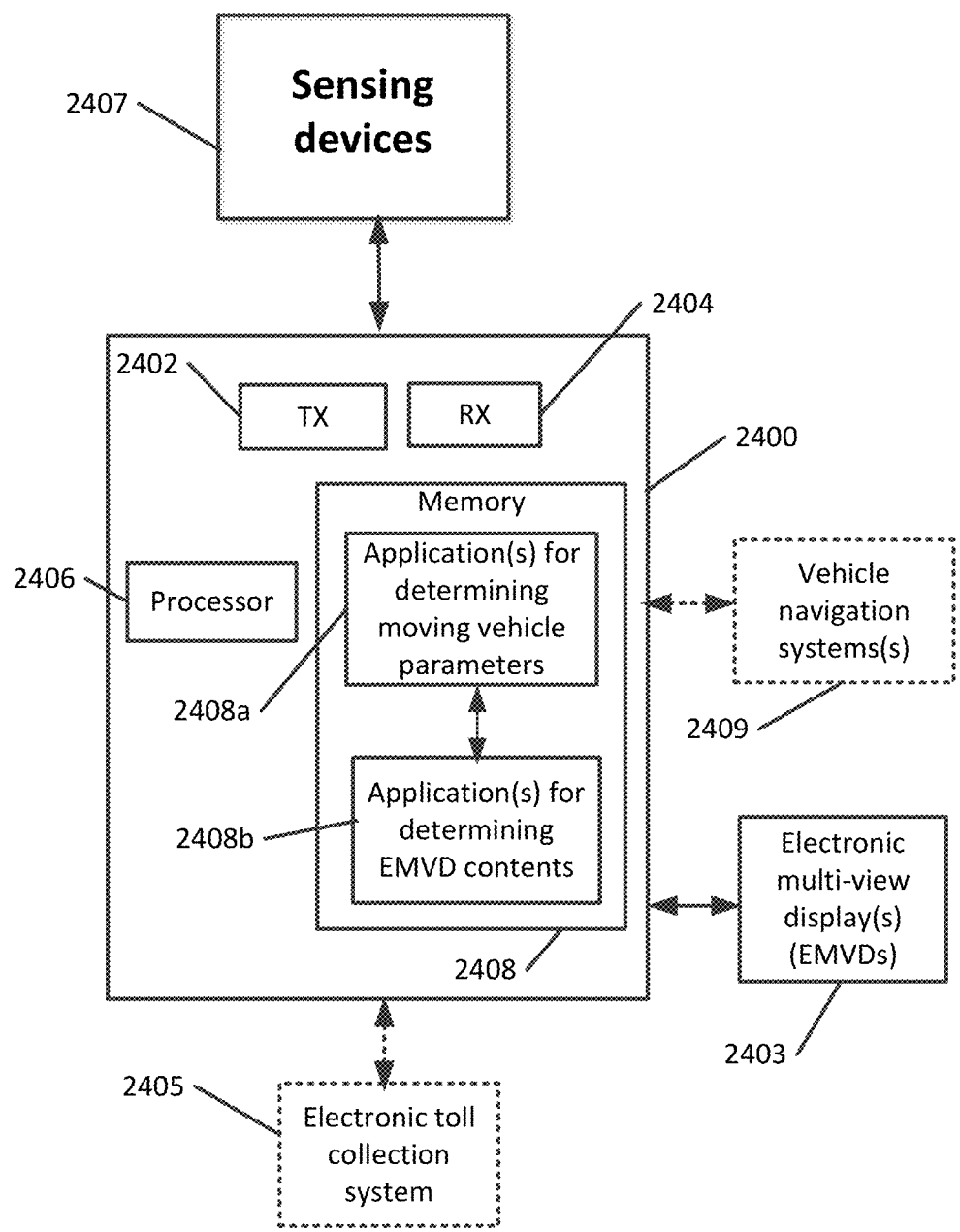
FIG. 24 is a detailed block diagram of a multi-view traffic signage system, according to an embodiment of the invention.

FIG. 24 is a more detailed block diagram of a multi-view traffic signage system 2400 which can be used for implementing various embodiments of the invention described herein. At the same time, FIG. 24 is a simplified block diagram of a system 2400 that is suitable for practicing the exemplary embodiments of this invention, e.g., in reference to FIGS. 1A, 1B, 2-23, and a specific manner in which components of the system are configured, to cause the system 2400 to operate.

The system 2400 comprises at least one computer (or one or more computers) 2401, sensing devices 2407 and EMVDs 2403 as indicated in the generalized block diagram shown in FIG. 1B. The computer (generally a computing device) 2401 may comprise, e.g., at least one transmitter 2402, at least one receiver 2404 (both can be wireless or wired), at least one processor 2406, and at least one memory 2408. The memory 2408 may comprise an application for determining moving vehicle parameters 2408a (based on the detected data from the sensing device 2407), and an application for determining EMVD contents 2408b (based on the determined parameters by the application 2408a) to implement various embodiments described herein. The transmitter 2402 and the receiver 2404 may be configured to transmit and receive signals (wirelessly or through wires) to and from other devices in the system 2400, such as electronic toll collection system 2405, vehicle navigation system(s) 2409, etc., and also possibly with further outside computers and devices, in order to facilitate performing various embodiments described herein.

The transmitter 2402 and the receiver 2404 may be generally means for transmitting/receiving and may be implemented as a transceiver, or a structural equivalent thereof.

Various embodiments of the at least one memory 2408 (e.g., computer readable memory) may include any data storage technology type which is suitable to the local technical environment, including but not limited to: semiconductor based memory devices, magnetic memory devices and systems, optical memory devices and systems, fixed memory, removable memory, disc memory, flash memory, DRAM, SRAM, EEPROM and the like. Various embodiments of the processor 2406 include but are not limited to: general purpose computers, special purpose computers, microprocessors, digital signal processors (DSPs), multi-core processors, embedded, and System on Chip (SoC) devices.

Each of the applications 2408*a* and 2408*b* may provide implementation of or instruction for various steps, for example, steps 110-116 shown in FIG. 1B and many others (e.g. see FIGS. 3, 7, 9, 11, 18 and 20).

Generally, the application 2408*a* can receive, from one or more sensing devices, detection data of a plurality of moving vehicles in one or more viewing regions of corresponding one or more electronic multi-view displays (EMVDs), and then determine, based on the detection data, one or more parameters at least including a location parameter (and possibly other parameters like, speed, classification, acceleration, direction, etc.) for each of the plurality of moving vehicles. The application 2408*b* can generate a plurality of traffic-related contents using the one or more determined parameters for each of the plurality of moving vehicles and provide instructions to the one or more EMVDs 2403 for displaying the generated traffic-related contents individually to each of the plurality of moving vehicles.

The modules 2408*a* and 2408*b* may be implemented using computer programs stored in the memory 2408, but in general it may be implemented as software, firmware and/or a hardware module, or a combination thereof. In particular, in the case of software or firmware, one embodiment may be implemented using a software related product such as a computer readable memory (e.g., non-transitory computer readable memory), computer readable medium or a computer readable storage structure comprising computer readable instructions (e.g., program instructions) using a computer program code (i.e., the software or firmware) thereon, to be executed by a computer processor.

It is noted that the examples of signage presented are just a sample of possible use cases of multi-view displays for traffic messaging. Other uses of multi-view displays in traffic scenarios do not depart from the spirit of the invention or restrict the scope of the claimed subject matter. In addition, multi-view displays may be used for multiple use-cases simultaneously. For example, a single multi-view sign may simultaneously direct merging information towards ramp lanes and speed information to passing lanes.

Multi-view displays may be used to show different messages to different vehicles simultaneously. They may also be used for programmable visibility, only showing the message to relevant vehicles and nothing to all other vehicles. For example, a multi-view commercial vehicle sign may show its message to only commercial vehicles.

Multi-view displays may be used to show messages to particular vehicles using a vehicular sensing system. Alternatively, they may be used to show messages to particular viewing zones. A combination of showing messages to particular vehicles and viewing zones is also possible.

Unless defined otherwise, technical and scientific terms used herein have the same meaning as is commonly understood by one having ordinary skill in the art to which this disclosure belongs. The terms "first", "second", and the like, as used herein, do not denote any order, quantity, or importance, but rather are employed to distinguish one element from another. Also, the terms "a" and "an" do not denote a limitation of quantity, but rather denote the presence of at least one of the referenced items. The use of "including," "comprising" or "having" and variations thereof herein, are meant to encompass the items listed thereafter and equivalents thereof, as well as additional items. The terms "connected" and "coupled" are not restricted to physical or mechanical connections or couplings, and can include electrical and optical connections or couplings, whether direct or indirect.

Furthermore, the skilled artisan will recognize the interchangeability of various features from different embodiments. The various features described, as well as other known equivalents for each feature, can be mixed and matched by one of ordinary skill in this art, to construct additional systems and techniques in accordance with principles of this disclosure.

In describing alternate embodiments of the apparatus claimed, specific terminology is employed for the sake of clarity. The invention, however, is not intended to be limited to the specific terminology so selected. Thus, it is to be understood that each specific element includes all technical equivalents that operate in a similar manner to accomplish similar functions.

It is to be understood that the foregoing description is intended to illustrate and not to limit the scope of the invention, which is defined by the scope of the appended claims. Other embodiments are within the scope of the following claims.

An example of a variation that would fall in the scope and spirit of the invention would be using the invention to design an experience using generic, placeholder content, with the intent of replacing that content with other content at a later time.

It is noted that various non-limiting embodiments, described and claimed herein, may be used separately, combined, or selectively combined for specific applications.

Further, some of the various features of the above non-limiting embodiments may be used to advantage, without the corresponding use of other described features. The foregoing description should therefore be considered as merely illustrative of the principles, teachings and exemplary embodiments of this invention, and not in limitation thereof.

What is claimed is:

1. A method, for providing traffic instructions to drivers in moving vehicles, comprising:
   providing, by one or more sensing devices, detection data for a plurality of moving vehicles in one or more viewing regions of corresponding one or more electronic multi-view displays (EMVDs);
   determining, by one or more computers based on the detection data, one or more parameters, including a location parameter, for each of the plurality of moving vehicles;
   generating, by the one or more computers, a plurality of traffic-related contents using the one or more determined parameters for each of the plurality of moving vehicles; and
   displaying, on the one or more EMVDs, the generated traffic-related contents for presenting individually to each of the plurality of moving vehicles.

2. The method of claim 1, wherein the one or more parameters further comprise any combination of classification, height, speed, acceleration, movement pattern and direction parameters of the plurality of moving vehicles, so that generating different traffic-related contents are further based, at least in part, upon the determined further parameters of the plurality of moving vehicles.

3. The method of claim 1, wherein the plurality of moving vehicles approach an intersection comprising a multi-view (MV) traffic light, and the determining of one or more parameters further comprises determining a speed parameter for each of the plurality of moving vehicles, where color lights of the MV traffic light comprise EMVDs.

4. The method of claim 3, wherein each of the color lights of the MV traffic light is a single-color EMVD and configured to provide a standard default color of red, yellow or green.

5. The method of claim 3, wherein the MV traffic light is assigned, per instructions from an external controller, a yellow default color to be displayed on a yellow EMVD, so that, based on the determined location and speed parameters for at least two vehicles moving toward the MV traffic light in front of the yellow EMVD, said generating of traffic-related contents comprises:
  assigning a green color for displaying on a green EMVD to be presented to a first vehicle of the at least two vehicles, the first vehicle being closer to the MV traffic light than a second vehicle of the at least two vehicles.

6. The method of claim 5, wherein said generating of traffic-related contents further comprises assigning a red color for displaying on a red EMVD to be presented to the second vehicle of the at least two vehicles.

7. The method of claim 1, wherein the generated traffic-related contents are displayed on one of the one or more EMVDs supplementary to a traffic light at an intersection.

8. The method of claim 7, wherein the generated traffic-related contents indicate whether or not a vehicle of the plurality of moving vehicles should proceed through the intersection.

9. The method of claim 7, wherein at least one of the supplementary EMVDs and the traffic light are in a vicinity of each other, so that both are visible from the plurality of moving vehicles approaching the intersection.

10. The method of claim 1, wherein the determining of one or more parameters further comprises determining a speed parameter for selected vehicles of the plurality of moving vehicles, and said generating of traffic-related contents comprises:
  assigning individual traffic messages for the selected vehicles to be simultaneously displayed on at least one EMVD of the one or more EMVDs.

11. The method of claim 10, wherein one of the individual traffic messages directs at least one driver to reduce speed.

12. The method of claim 10, wherein at least one EMVD is a segmented character EMVD for displaying simultaneously current speeds to the selected vehicles.

13. The method of claim 10, wherein the selected vehicles are moving in different lanes in view of the at least one EMVD.

14. The method of claim 1, wherein one content of the traffic related contents presented to one vehicle of the plurality of moving vehicles is generated, using at least in part the detection data provided by a first sensor and a second sensor of the one or more sensing devices, such that at least one of the one or more parameters indicates that the first and second sensors sense the same one vehicle, so that the one content is presented to the one vehicle when the one vehicle is no longer in a range of the first sensor.

15. The method of claim 1, wherein the determining of one or more parameters further comprises determining a classification parameter for selected vehicles of the plurality of moving vehicles, and said generating of traffic-related contents comprises:
  assigning individual traffic messages for the selected vehicles to be simultaneously displayed on at least one EMVD of the one or more EMVDs.

16. The method of claim 15, wherein one of the individual traffic messages directs trucks to exit and one another of the individual traffic messages directs autos to merge.

17. The method of claim 1, wherein, as several vehicles of the plurality of moving vehicles approach a tollgate, and the determining of one or more parameters further comprises determining a classification parameter including a unique identifier for each of several vehicles, the method further comprises:
  providing, by one of the one or more computers to an electronic toll collection system, the unique identifier for the each of several vehicles, and
  receiving, by the one computer from the electronic toll collection system, account toll information for the each of several vehicles,
  so that the generated traffic-related contents comprise account toll information for the each of several vehicles, followed by displaying the account toll information on at least one EMVD of the one or more EMVDs individually to the each of several vehicles.

18. The method of claim 1, wherein at least one lane of a multi-lane road is obstructed, and several vehicles of the plurality of moving vehicles move in multiple lanes including the at least one lane in view of one EMVD of the one or more EMVDs, so that said generating of traffic-related contents comprises generating different individual messages for displaying on the one EMVD to one or more of the several vehicles to help facilitate merging due to the obstruction in the at least one lane.

19. The method of claim 1, further comprising:
  receiving, by one of the one or more computers from at least one vehicle of the plurality of moving vehicles, navigational information being generated by a navigational device in the at least one vehicle,
  so that said generating of traffic-related contents for the at least one vehicle is based on said navigational information and on the determined location of the at least one vehicle, where the traffic-related contents provides further navigational details being displayed on one or several EMVDs of the one or more EMVDs to assist the at least one vehicle to reach a desired destination.

20. The method of claim 19, wherein the navigational device comprises a smartphone.

21. The method of claim 1, wherein the determining of one or more parameters further comprises determining a number of times one vehicle of a plurality of moving vehicles repeated a same route, so that said generating of traffic-related contents comprises a warning about the number of times circling the same route and an instruction to change a destination.

22. The method of claim 1, wherein the determining of one or more parameters further comprises determining a height parameter for all vehicles of the plurality of moving vehicles in order to be within a clearance height of infrastructure toward which said all vehicles are moving, and said generating of traffic-related contents comprises:
  assigning individual traffic warning messages about vehicle's height for said all vehicles, to be displayed on at least one EMVD of the one or more EMVDs.

23. The method of claim 22, wherein one of the individual traffic messages to a vehicle directs a vehicle to exit because said vehicle is too tall, or confirms that a vehicle's height is below a threshold.

24. The method of claim 1, wherein a vehicle of the plurality of moving vehicles enters a parking garage, and based on the determined location parameter of the vehicle, said generating of traffic-related contents comprises: assigning an instruction to the vehicle to go to an empty parking spot to occupy the empty parking spot, as displayed on one of the one or more EMVDs to be visible from the vehicle.

25. A multi-view traffic signage system, comprising:
one or more sensing devices, configured to provide detection data of a plurality of moving vehicles in one or more viewing regions of corresponding one or more electronic multi-view displays (EMVDs);
one or more computers, configured to:
  (a) determine, based on the detection data, one or more parameters at least including a location parameter for each of the plurality for moving vehicles, and
  (b) generate a plurality of traffic-related contents using the one or more determined parameters for each of the plurality of moving vehicles; and
one or more EMVDs, configured to display the generated traffic-related contents for presenting individually to each of the plurality of moving vehicles.

26. A method, for providing traffic instructions to divers in moving vehicles, comprising:
receiving, by at least one computer from one or more sensing devices, detection data for a plurality of moving vehicles in one or more viewing regions of corresponding one or more electronic multi-view displays (EMVDs);
determining, by the at least one computer based on the detection data, one or more parameters at least including a location parameter for each of the plurality of moving vehicles;
generating, by the at least one computer, a plurality of traffic-related contents using the one or more determined parameters for each of the plurality of moving vehicles; and
providing instructions to the one or more EMVDs for displaying the generated traffic-related contents for presenting individually to each of the plurality of moving vehicles.

* * * * *